US012579360B2

(12) United States Patent
Suzuki et al.

(10) Patent No.: US 12,579,360 B2
(45) Date of Patent: Mar. 17, 2026

(54) LEARNING SUPPORT APPARATUS FOR CREATING MULTIPLE-CHOICE QUIZ

(71) Applicant: CANON KABUSHIKI KAISHA, Tokyo (JP)

(72) Inventors: Shuichi Suzuki, Kanagawa (JP); Kohei Ando, Tokyo (JP); Mitsugu Kamizuru, Shizuoka (JP); Masaki Yoshikoshi, Shizuoka (JP); Ayaka Asano, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 212 days.

(21) Appl. No.: 18/457,460

(22) Filed: Aug. 29, 2023

(65) Prior Publication Data

US 2024/0078383 A1 Mar. 7, 2024

(30) Foreign Application Priority Data

Sep. 6, 2022 (JP) ................................ 2022-141516

(51) Int. Cl.
*G06F 40/247* (2020.01)
*G09B 7/08* (2006.01)
(52) U.S. Cl.
CPC ............. *G06F 40/247* (2020.01); *G09B 7/08* (2013.01)
(58) Field of Classification Search
CPC ...... G06F 40/20; G06F 40/237; G06F 40/253; G06F 40/279; G09B 7/00; G09B 7/06; G09B 7/08
See application file for complete search history.

(56) References Cited

U.S. PATENT DOCUMENTS

| | | | | |
|---|---|---|---|---|
| 9,684,876 B2* | 6/2017 | Agarwalla | .............. | G06F 40/30 |
| 2011/0257961 A1* | 10/2011 | Tinkler | .................... | G09B 7/06 |
| | | | | 434/156 |
| 2017/0169717 A1* | 6/2017 | Allen | ....................... | G09B 7/08 |
| 2017/0330079 A1* | 11/2017 | Akolkar | ................. | G06N 5/022 |
| 2019/0180640 A1* | 6/2019 | Foster | ..................... | G09B 7/00 |

(Continued)

FOREIGN PATENT DOCUMENTS

| | | |
|---|---|---|
| JP | 2002014990 A | 1/2002 |
| JP | 2006198279 A | 8/2006 |

(Continued)

OTHER PUBLICATIONS

Nwafor, Chidinma A., and Ikechukwu E. Onyenwe. "An automated multiple-choice question generation using natural language processing techniques." arXiv preprint arXiv:2103.14757 (2021). (Year: 2021).*

(Continued)

*Primary Examiner* — Paras D Shah
(74) *Attorney, Agent, or Firm* — ROSSI, KIMMS & McDOWELL LLP

(57) ABSTRACT

A storage device stores failures and lessons. A processor accepts input of text serving as a question sentence in a multiple-choice quiz, computes an evaluation value for a consistency between the text and each of lessons stored in the storage device, and determines one lesson to serve as a correct option in the multiple-choice quiz and at least one lesson to serve as an incorrect option in the multiple-choice quiz, based on the evaluation value for each of the plurality of lessons computed in the computing operation.

21 Claims, 27 Drawing Sheets

(56) References Cited

U.S. PATENT DOCUMENTS

| | | | | |
|---|---|---|---|---|
| 2020/0175046 | A1* | 6/2020 | Wang | G06F 16/358 |
| 2022/0004893 | A1* | 1/2022 | Jain | G06F 40/186 |
| 2023/0080674 | A1* | 3/2023 | Attali | G06F 40/56 |

FOREIGN PATENT DOCUMENTS

| | | | |
|---|---|---|---|
| JP | 2008059417 | A | 3/2008 |
| JP | 2012098787 | A | 5/2012 |

OTHER PUBLICATIONS

Translation of WO2006134986A1, Hoshino. (Year: 2006).*
Translation of JP2014021273A, Takada, Takahisa. (Year: 2014).*
Translation of KR 101847345-B1, Yi Mun Yong. (Year: 2018).*
Translation of CN114860772A, Li, Ke-yan. (Year: 2022).*
Translation of KR-20210049437-A, Hong, Teak. (Year: 2021).*
Zhang, Cheng, et al. "Generating adequate distractors for multiple-choice questions." arXiv preprint arXiv:2010.12658 (2020).*
Mitkov, Ruslan, Andrea Varga, and Luz Rello. "Semantic similarity of distractors in multiple-choice tests: extrinsic evaluation." Proceedings of the workshop on geometrical models of natural language semantics. 2009.*
Maheen, Farah, et al. "Automatic computer science domain multiple-choice questions generation based on informative sentences." PeerJ Computer Science 8 (2022): e1010.*

* cited by examiner

F I G. 2
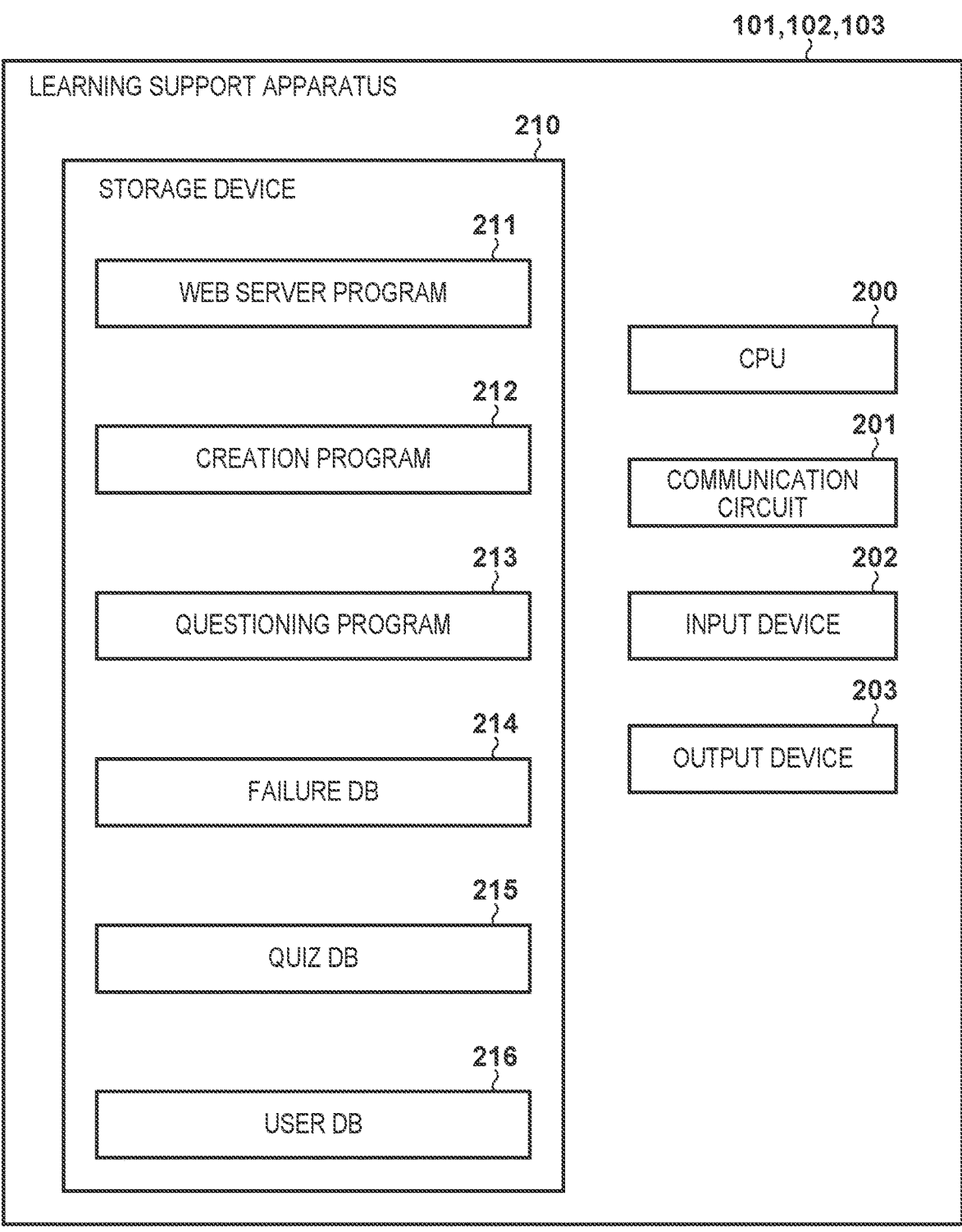

F I G. 3
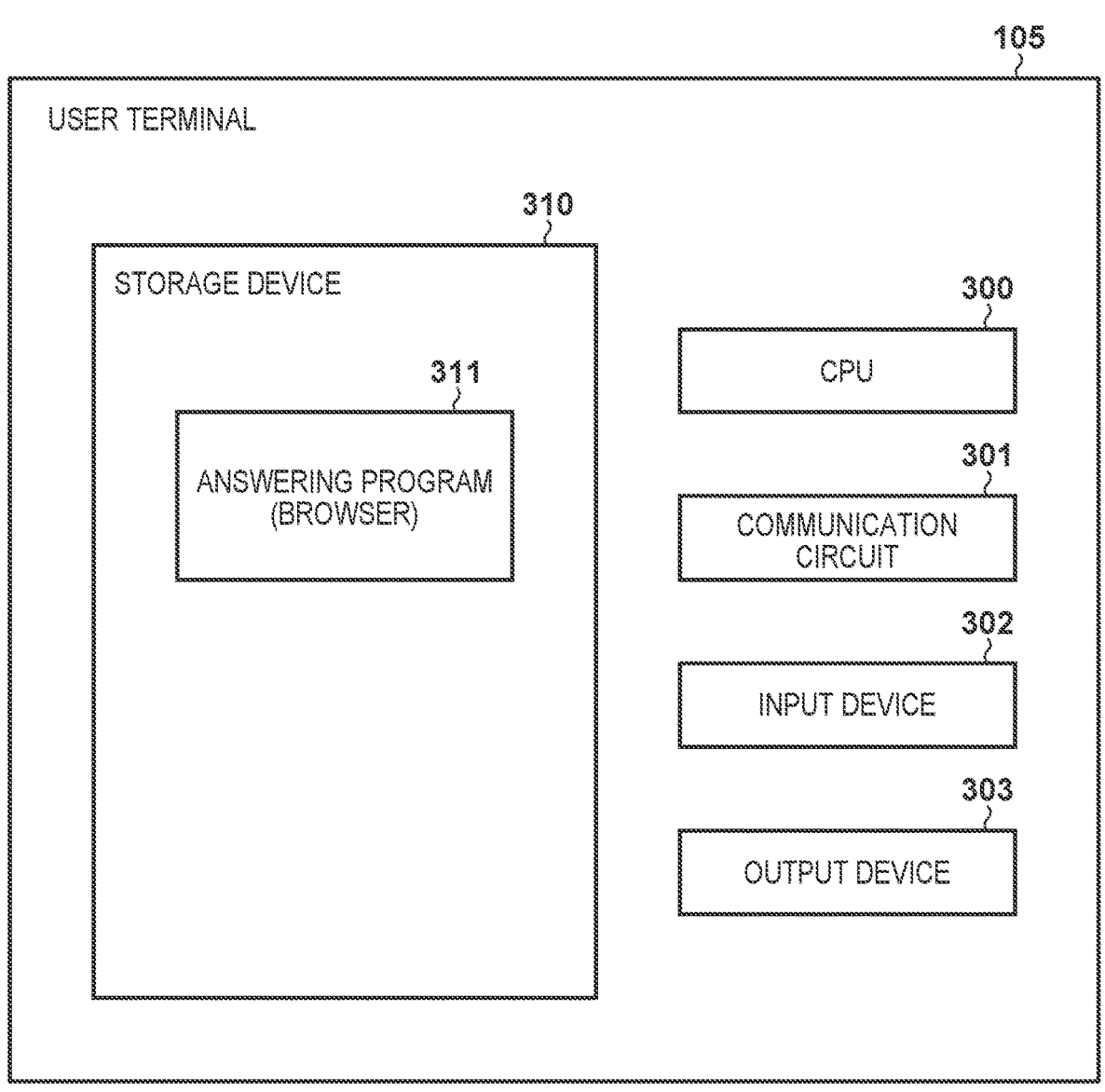

| SINGLE PHRASE (SLOGAN) | KNOWLEDGE | TAG INFORMATION |
|---|---|---|
| **** | **** | **** |
| DON'T JUDGE BY APPEARANCE | SIMILAR THINGS IN CLOSE PROXIMITY CAN BE MISTAKEN FOR EACH OTHER | #ERRONEOUS ASSEMBLY #PREVENTION #TROUBLE #GENERAL-PURPOSE PRODUCT #TAPE #SHEET #ARTICLE #TEMPORARY #STORAGE #CARE #NECESSARY #PEOPLE #INTUITION #CLEAR #UNDERSTAND #DIFFERENTIATION #FACILITATE #COLOR #NUMBERING #INTRODUCE #EMAIL |
| TRUST MARKS INCREASING RISK | LESS LIKELY TO NOTICE DISPLAY OF VARIOUS LANGUAGES AND COLLECTION OF MARKS | #MEANING #FIND OUT #NUMBER #STRING #UNFAMILIAR #LANGUAGE #MARK #EYE #INFORMATION #COMPLICATED #DETECTION #IMAGE RECOGNITION #NOTATION #FRENCH #SPANISH |
| DON'T TRUST PRECONCEPTIONS | BECOMING CAUGHT UP IN PRECONCEPTIONS OR ASSUMPTIONS MAKES IT DIFFICULT TO NOTICE MISTAKES | #INFORMATION #LESS #INCORRECT #DECISION #JUDGMENT #PRECONCEPTION #CAUSE #INVESTIGATION #COMPREHENSIVE #CONDUCT #KEY #ISSUE #HABITUAL |
| SPREADING RESPONSIBILITY CREATES DIRE CONSEQUENCES | RELYING ON EACH OTHER TOO MUCH MAKES IT DIFFICULT TO NOTICE MISTAKES | #WORK #DISTRIBUTE #SENSE OF RESPONSIBILITY #SPREADING #ATTENTION #REDUCE #MISTAKE #SEPARATE #CONDUCT #DOUBLE CHECK #CONCURRENT #READ TOGETHER #ENABLE #CONFIRM #ADDRESS |
| STOP AND RESUME, START AND REGRET | WORK INTERRUPTION WILL CAUSE FORGET TASKS TO BE FORGOTTEN | #BUSY #COMPLEX #BUSINESS #EASY #REASONABLE #METHOD #SELECT #RULE #OBSERVE #CHANGE #DIFFICULT #REVIEW #PROPOSE #CONFIRM #FORGET |
| PEOPLE GROW ACCUSTOMED, FOR BETTER OR WORSE | PEOPLE PERFORM HABITUAL TASKS AUTOMATICALLY | #GET USED TO #WORK #ATTENTION #PAY #DIFFICULT #MISTAKE #LEAD TO #TIME #DAMAGE #THINK #NECESSARY #COMPLY #FINGER POINTING #CONFIRM #DOUBLE-CHECK #CONDUCT #ASSUMPTION |

FIG. 6

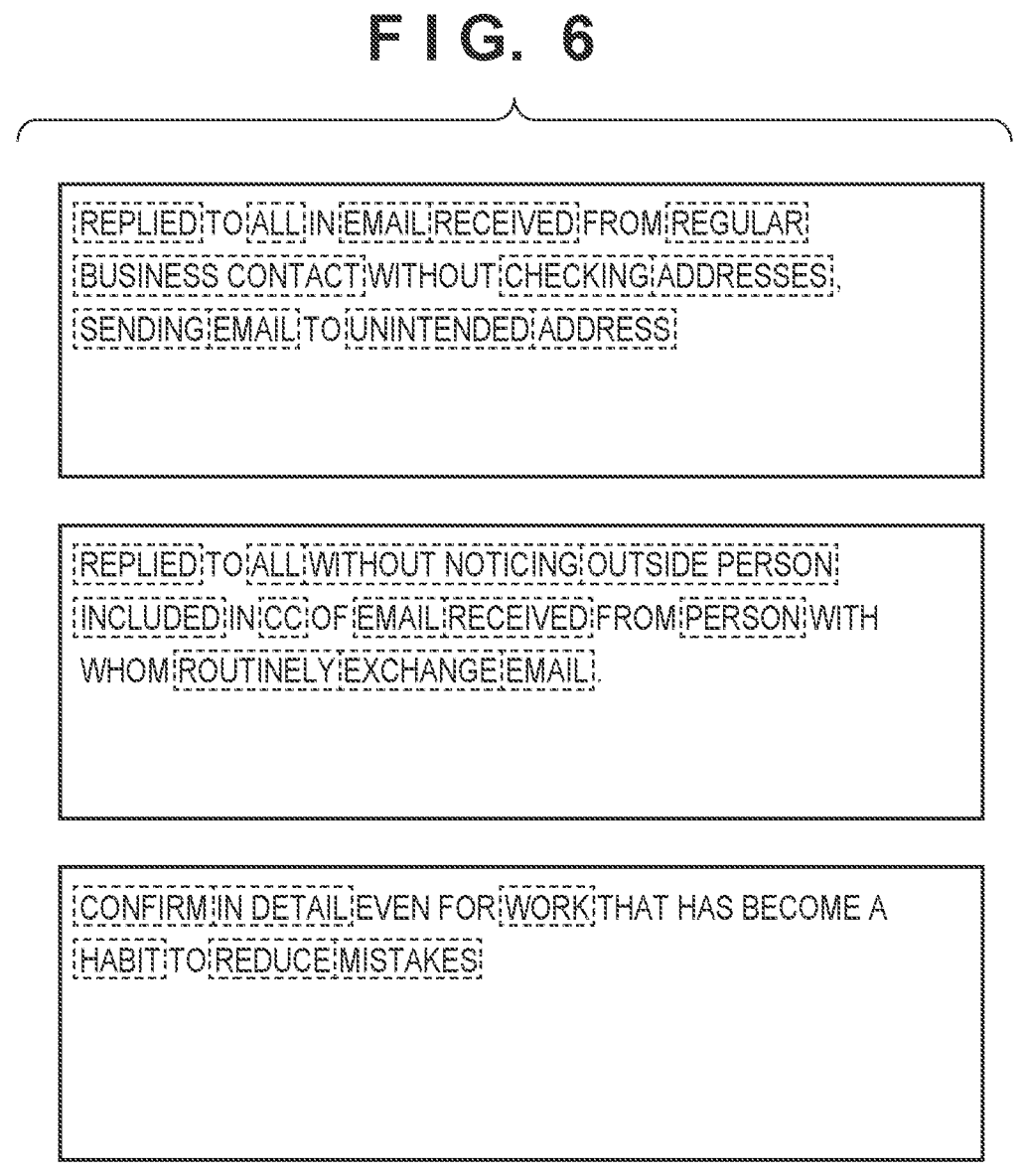

REPLIED TO ALL IN EMAIL RECEIVED FROM REGULAR
BUSINESS CONTACT WITHOUT CHECKING ADDRESSES,
SENDING EMAIL TO UNINTENDED ADDRESS

REPLIED TO ALL WITHOUT NOTICING OUTSIDE PERSON
INCLUDED IN CC OF EMAIL RECEIVED FROM PERSON WITH
WHOM ROUTINELY EXCHANGE EMAIL.

CONFIRM IN DETAIL EVEN FOR WORK THAT HAS BECOME A
HABIT TO REDUCE MISTAKES

F I G. 7

701

| SINGLE PHRASE (SLOGAN) | KNOWLEDGE | EVALUATION VALUE |
|---|---|---|
| PEOPLE GROW ACCUSTOMED, FOR BETTER OR WORSE | PEOPLE PERFORM HABITUAL TASKS AUTOMATICALLY | 0.61 |
| SPREADING RESPONSIBILITY CREATES DIRE CONSEQUENCES | RELYING ON EACH OTHER TOO MUCH MAKES IT DIFFICULT TO NOTICE MISTAKES | 0.38 |
| DON'T TRUST PRECONCEPTIONS | BECOMING CAUGHT UP IN PRECONCEPTIONS OR ASSUMPTIONS MAKES IT DIFFICULT TO NOTICE MISTAKES | 0.22 |
| LOTS OF INFORMATION IS TOO MUCH | THERE IS A LIMIT TO HOW MUCH INFORMATION PEOPLE CAN PROCESS AT ONE TIME | 0.19 |
| DON'T JUDGE BY APPEARANCE | SIMILAR THINGS IN CLOSE PROXIMITY CAN BE MISTAKEN FOR EACH OTHER | 0.17 |
| STOP AND RESUME, START AND REGRET | WORK INTERRUPTION WILL CAUSE FORGET TASKS TO BE FORGOTTEN | 0.06 |
| TRUST MARKS INCREASING RISK | LESS LIKELY TO NOTICE DISPLAY OF VARIOUS LANGUAGES AND COLLECTION OF MARKS | 0.05 |

F I G. 8
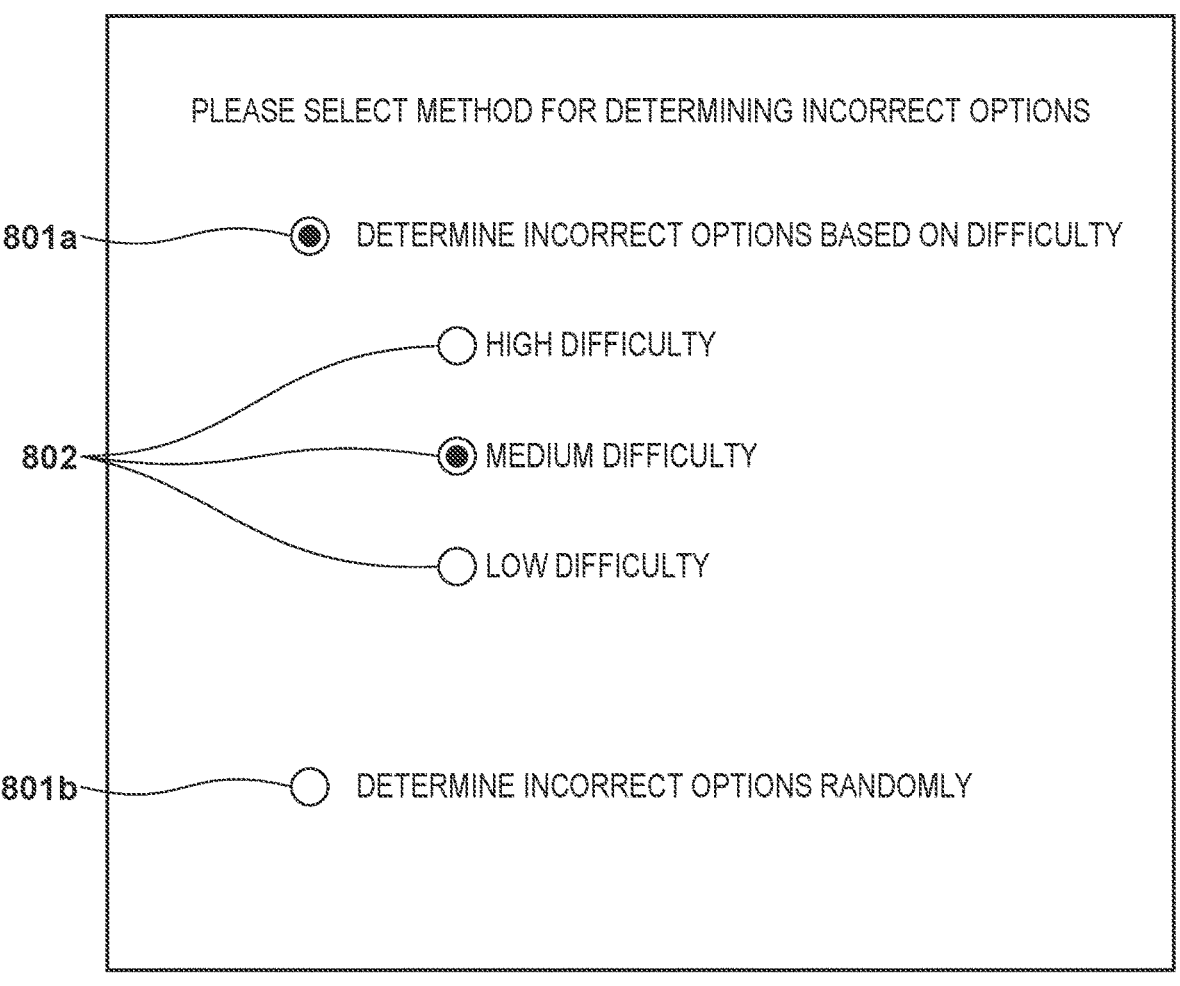

FIG. 9

| SINGLE PHRASE (SLOGAN) | KNOWLEDGE | EVALUATION VALUE E | OPTION TYPE |
|---|---|---|---|
| PEOPLE GROW ACCUSTOMED, FOR BETTER OR WORSE | PEOPLE PERFORM HABITUAL TASKS AUTOMATICALLY | 0.61 | CORRECT OPTION |
| SPREADING RESPONSIBILITY CREATES DIRE CONSEQUENCES | RELYING ON EACH OTHER TOO MUCH MAKES IT DIFFICULT TO NOTICE MISTAKES | 0.38 | INCORRECT OPTION FOR HIGH DIFFICULTY |
| DON'T TRUST PRECONCEPTIONS | BECOMING CAUGHT UP IN PRECONCEPTIONS OR ASSUMPTIONS MAKES IT DIFFICULT TO NOTICE MISTAKES | 0.22 | INCORRECT OPTION FOR HIGH DIFFICULTY |
| LOTS OF INFORMATION IS TOO MUCH | THERE IS A LIMIT TO HOW MUCH INFORMATION PEOPLE CAN PROCESS AT ONE TIME | 0.19 | INCORRECT OPTION FOR MEDIUM DIFFICULTY |
| DON'T JUDGE BY APPEARANCE | SIMILAR THINGS IN CLOSE PROXIMITY CAN BE MISTAKEN FOR EACH OTHER | 0.17 | INCORRECT OPTION FOR MEDIUM DIFFICULTY |
| STOP AND RESUME, START AND REGRET | WORK INTERRUPTION WILL CAUSE FORGET TASKS TO BE FORGOTTEN | 0.06 | INCORRECT OPTION FOR LOW DIFFICULTY |
| TRUST MARKS INCREASING RISK | LESS LIKELY TO NOTICE DISPLAY OF VARIOUS LANGUAGES AND COLLECTION OF MARKS | 0.05 | INCORRECT OPTION FOR LOW DIFFICULTY |

901

701

F I G. 10
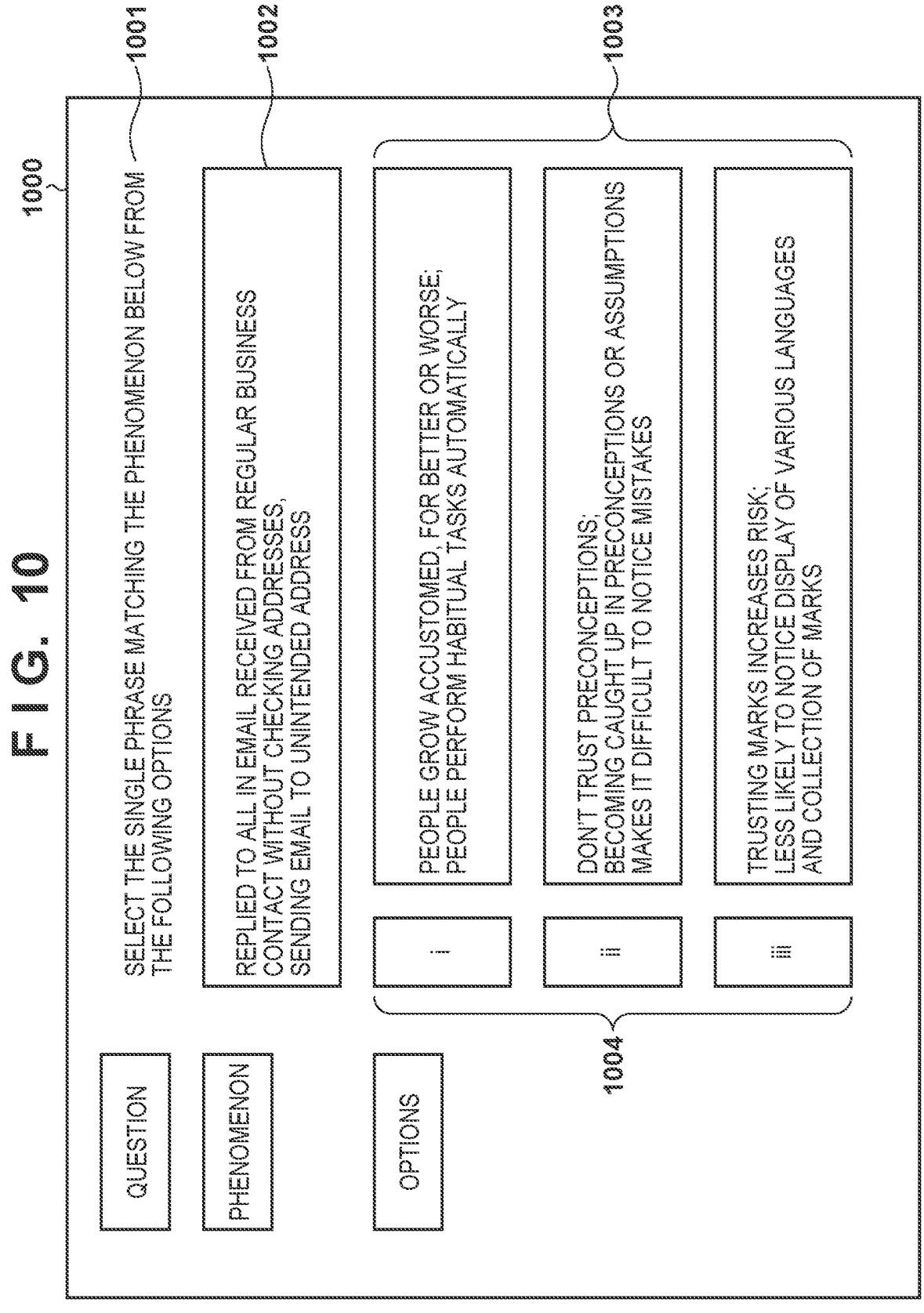

F I G. 11

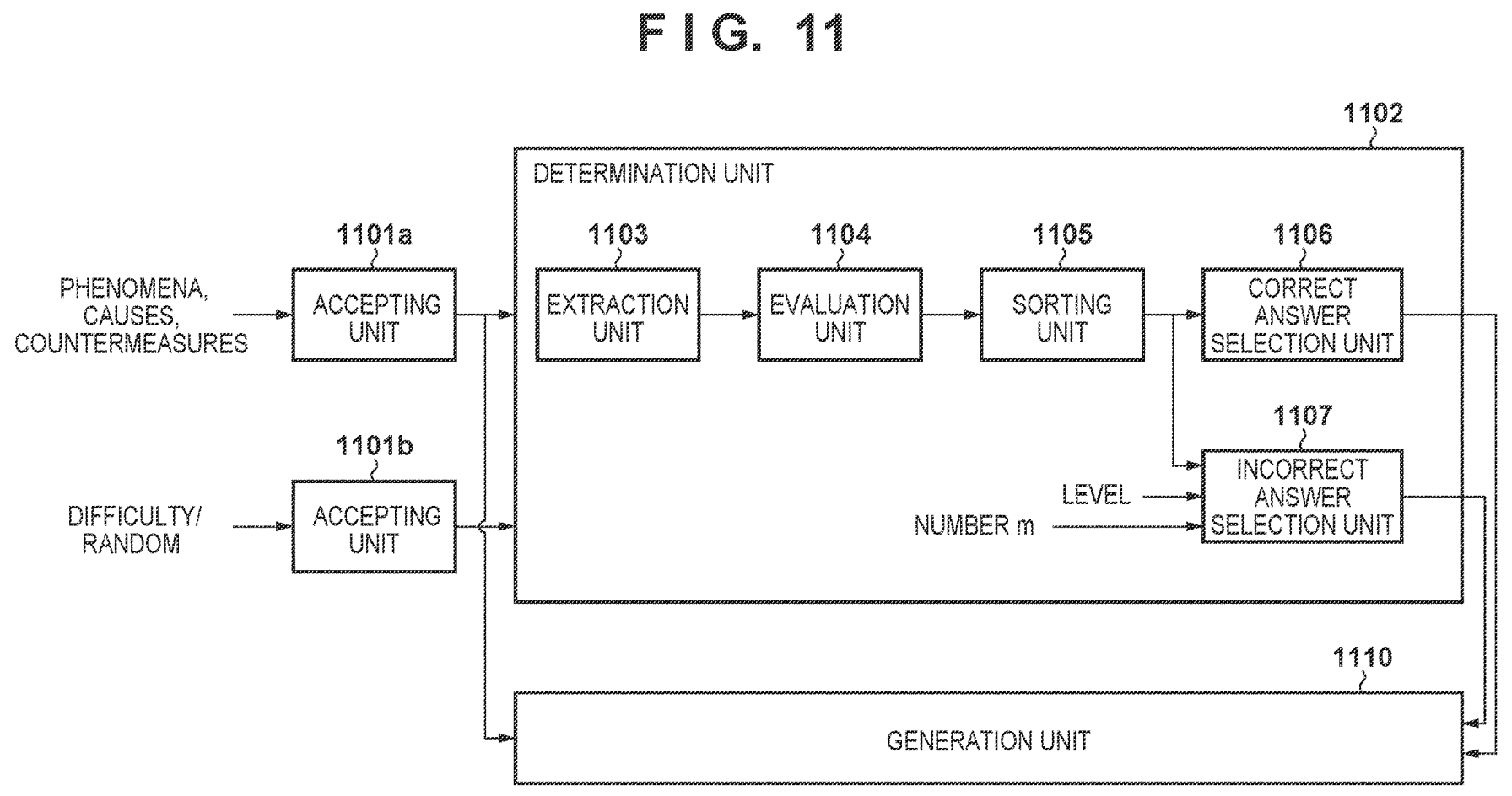

DETERMINATION UNIT 1102

1101a ACCEPTING UNIT — PHENOMENA, CAUSES, COUNTERMEASURES

1101b ACCEPTING UNIT — DIFFICULTY/RANDOM

1103 EXTRACTION UNIT

1104 EVALUATION UNIT

1105 SORTING UNIT

1106 CORRECT ANSWER SELECTION UNIT

1107 INCORRECT ANSWER SELECTION UNIT

LEVEL

NUMBER m

1110 GENERATION UNIT

F I G. 13
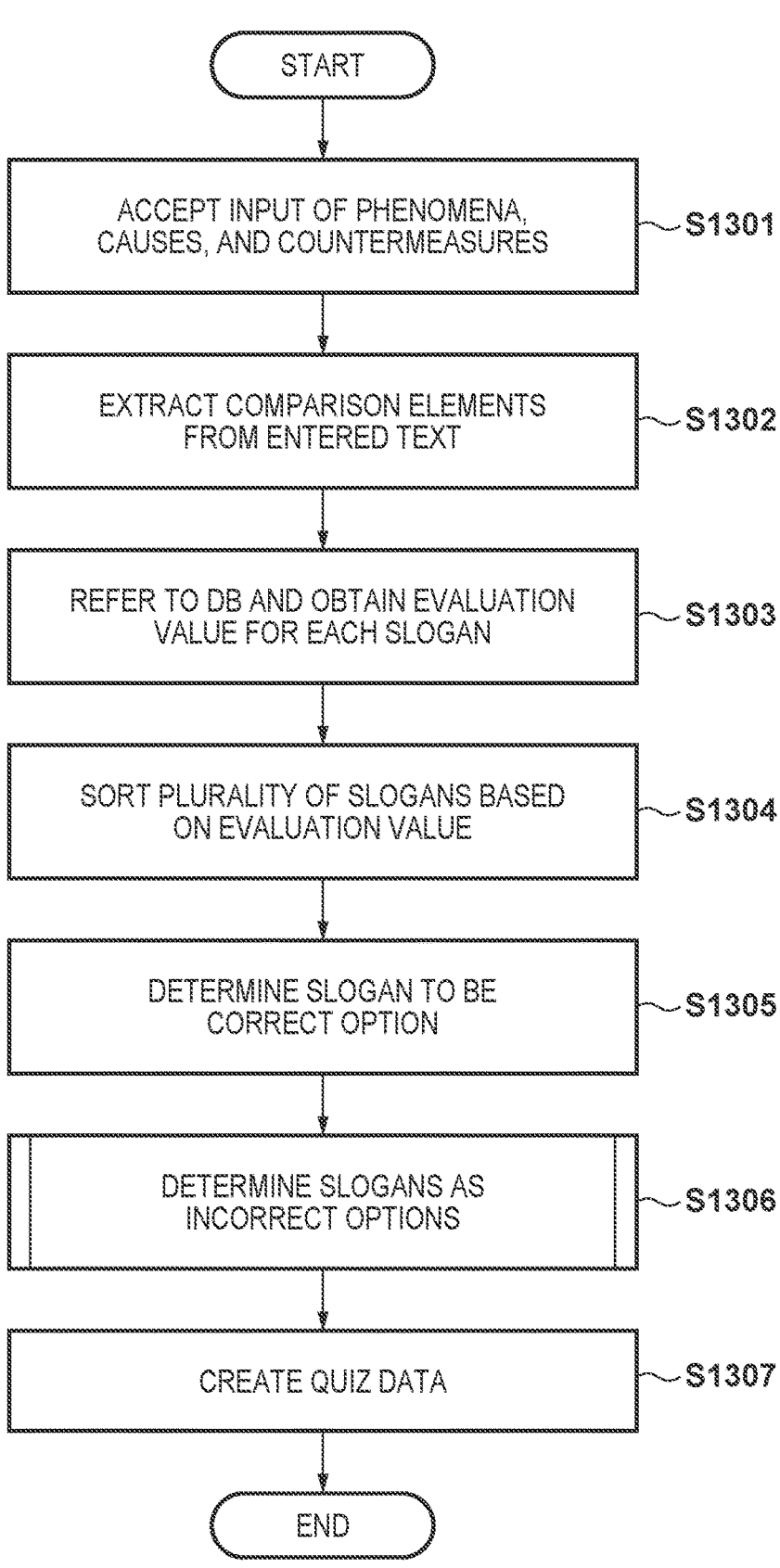
START
ACCEPT INPUT OF PHENOMENA,
CAUSES, AND COUNTERMEASURES — S1301
EXTRACT COMPARISON ELEMENTS
FROM ENTERED TEXT — S1302
REFER TO DB AND OBTAIN EVALUATION
VALUE FOR EACH SLOGAN — S1303
SORT PLURALITY OF SLOGANS BASED
ON EVALUATION VALUE — S1304
DETERMINE SLOGAN TO BE
CORRECT OPTION — S1305
DETERMINE SLOGANS AS
INCORRECT OPTIONS — S1306
CREATE QUIZ DATA — S1307
END

F I G. 14
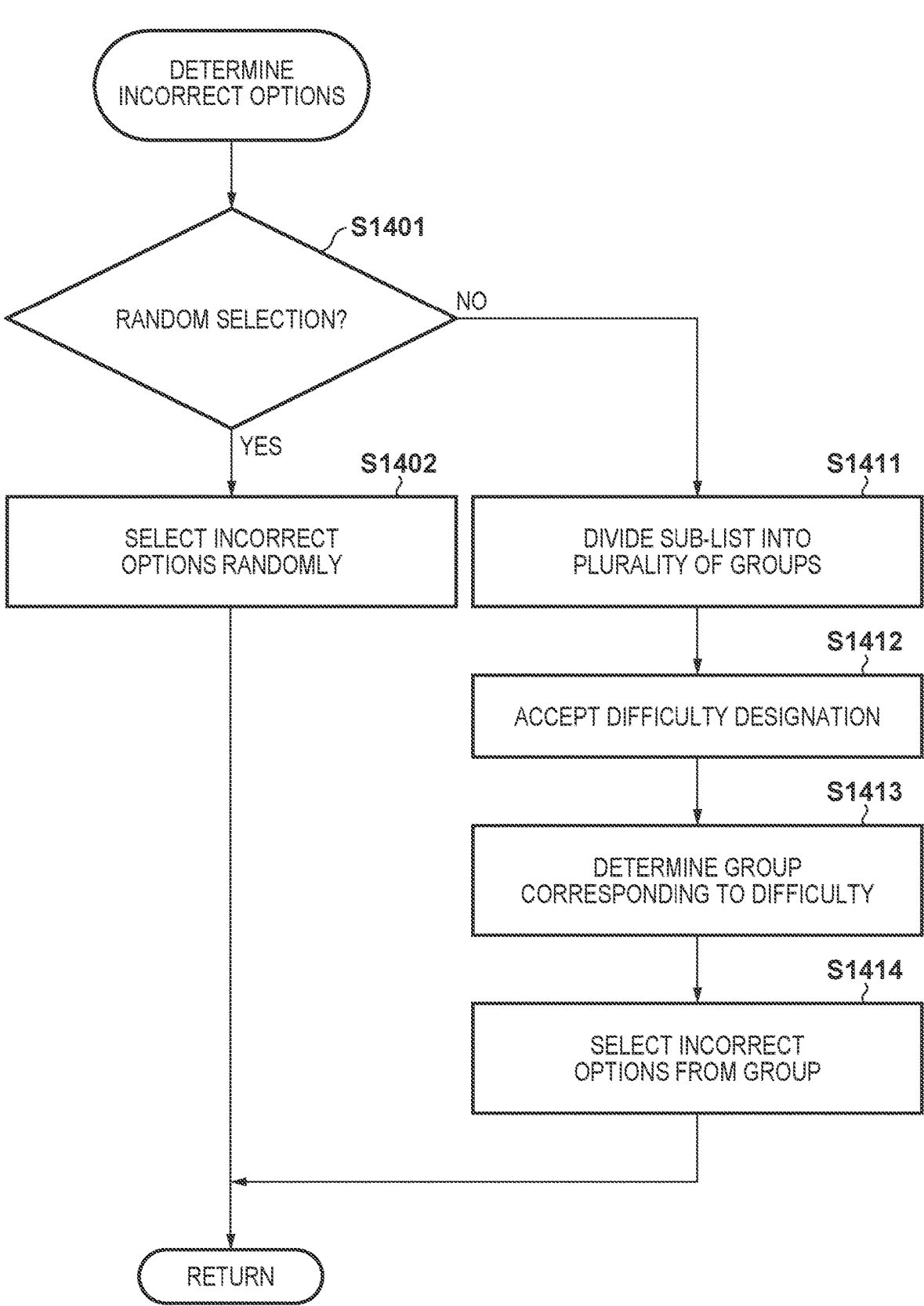

F I G. 15
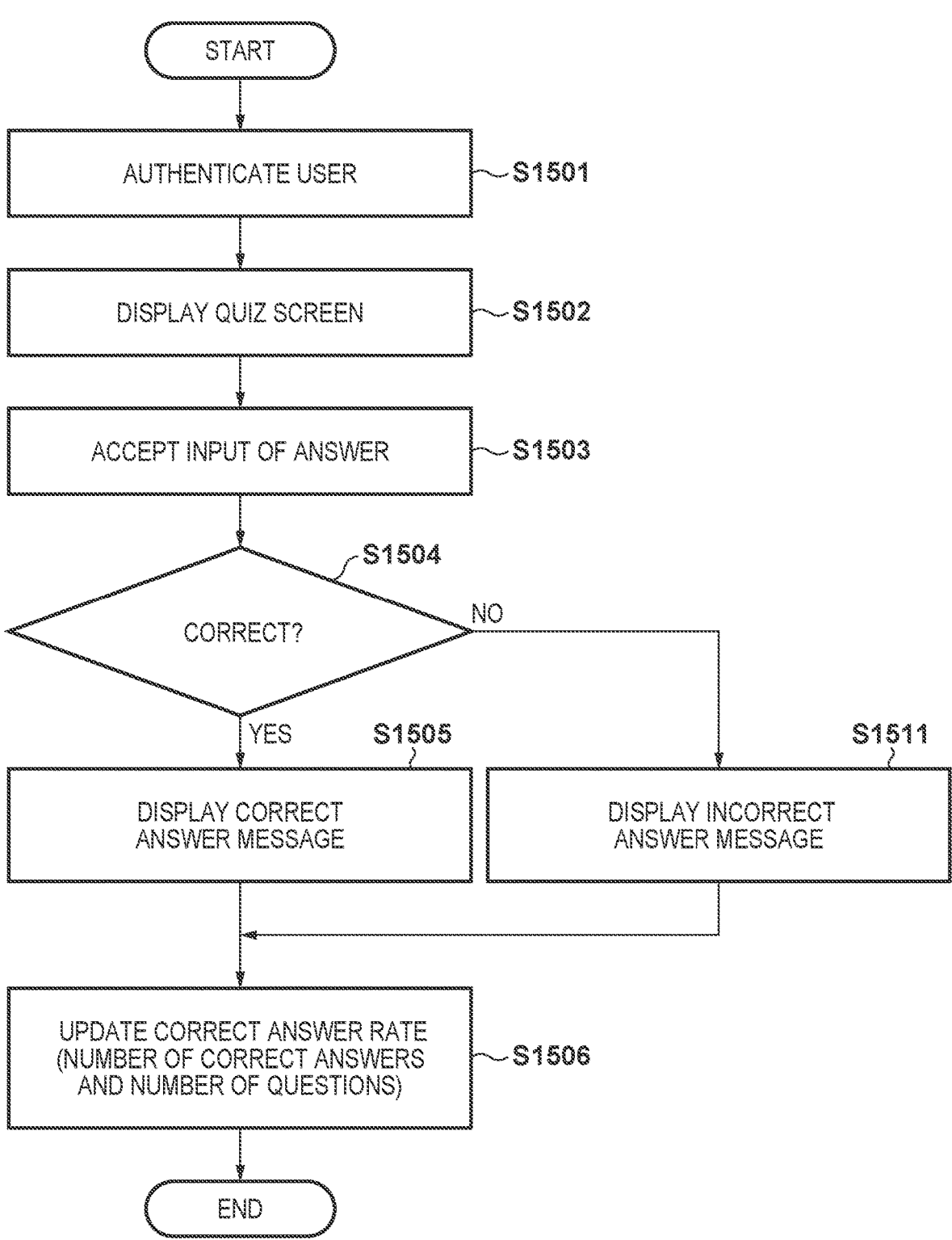

F I G.  16
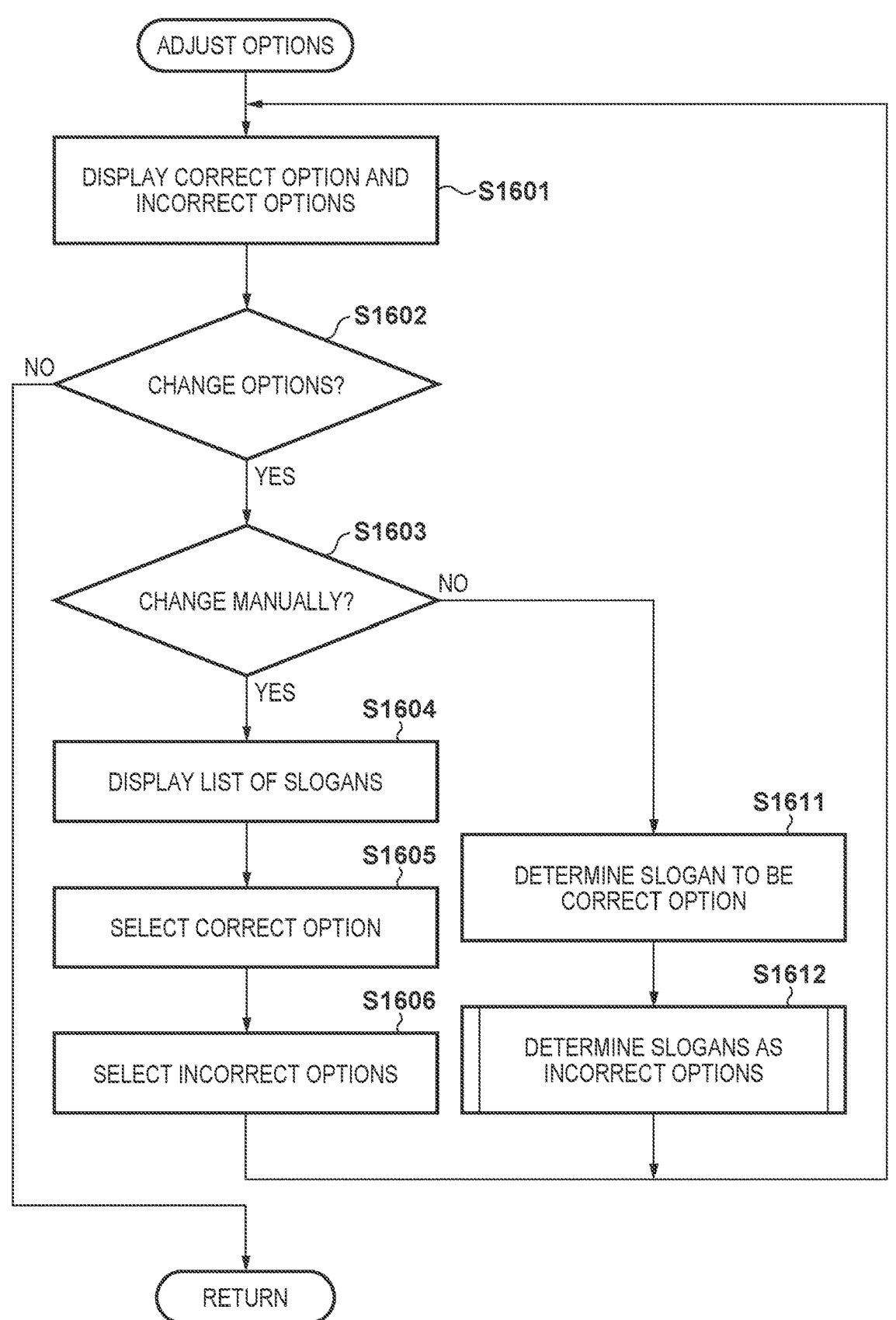

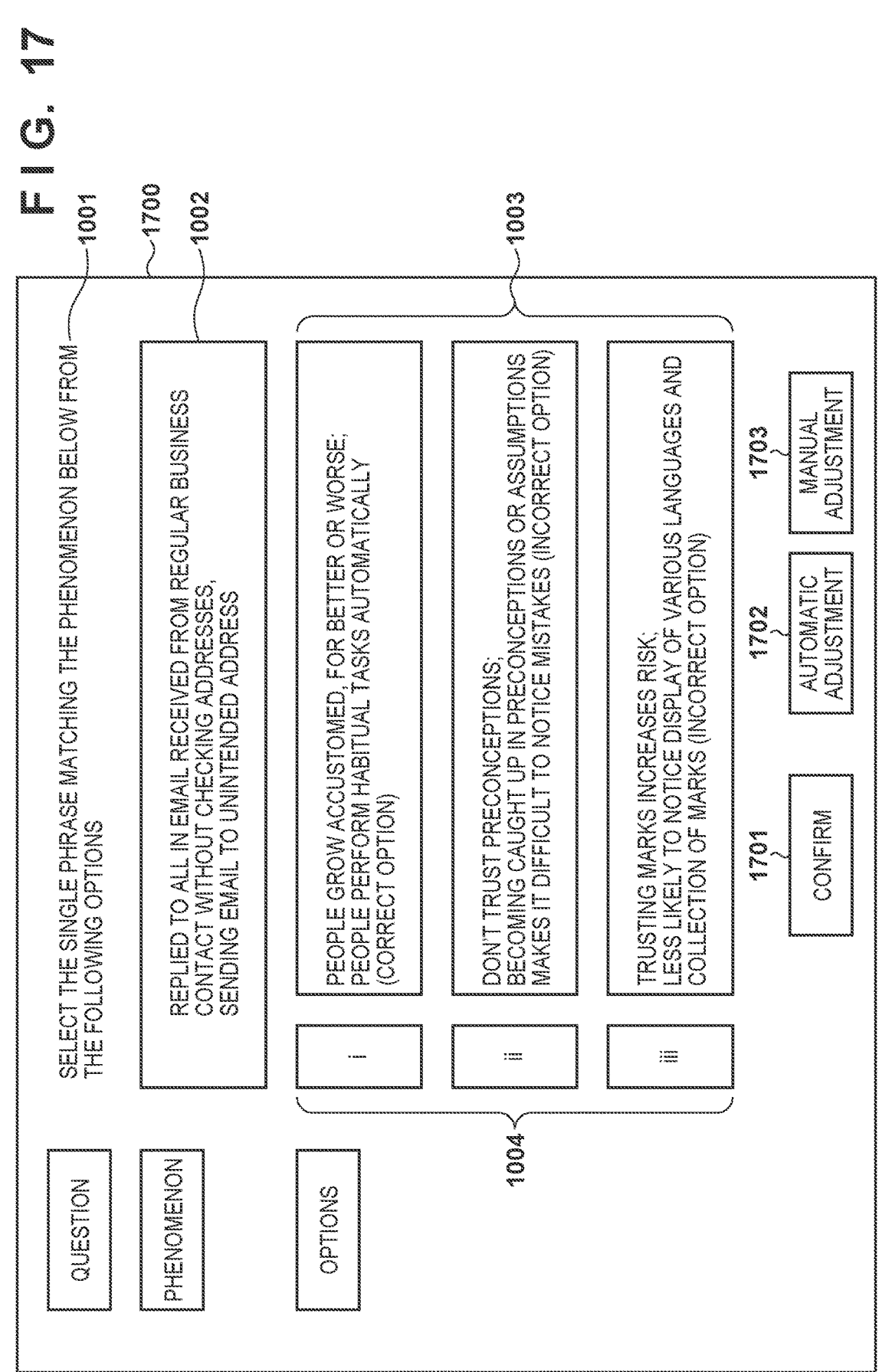
F I G.  17

F I G.  18

1800

| | SINGLE PHRASE (SLOGAN) | KNOWLEDGE | EVALUATION VALUE E | CORRECT OPTION | INCORRECT OPTION |
|---|---|---|---|---|---|
| | | | | 1802 | 1803 |
| 1801 | PEOPLE GROW ACCUSTOMED, FOR BETTER OR WORSE | PEOPLE PERFORM HABITUAL TASKS AUTOMATICALLY | 0.61 | ◯ | ☐ |
| | SPREADING RESPONSIBILITY CREATES DIRE CONSEQUENCES | RELYING ON EACH OTHER TOO MUCH MAKES IT DIFFICULT TO NOTICE MISTAKES | 0.38 | ◉ | ☐ |
| | DON'T TRUST PRECONCEPTIONS | BECOMING CAUGHT UP IN PRECONCEPTIONS OR ASSUMPTIONS MAKES IT DIFFICULT TO NOTICE MISTAKES | 0.22 | ◯ | ☑ |
| | LOTS OF INFORMATION IS TOO MUCH | THERE IS A LIMIT TO HOW MUCH INFORMATION PEOPLE CAN PROCESS AT ONE TIME | 0.19 | ◯ | ☐ |
| | DON'T JUDGE BY APPEARANCE | SIMILAR THINGS IN CLOSE PROXIMITY CAN BE MISTAKEN FOR EACH OTHER | 0.17 | ◯ | ☑ |
| | STOP AND RESUME, START AND REGRET | WORK INTERRUPTION WILL CAUSE FORGET TASKS TO BE FORGOTTEN | 0.06 | ◯ | ☐ |
| | TRUST MARKS INCREASING RISK | LESS LIKELY TO NOTICE DISPLAY OF VARIOUS LANGUAGES AND COLLECTION OF MARKS | 0.05 | ◯ | ☐ |

F I G.  19
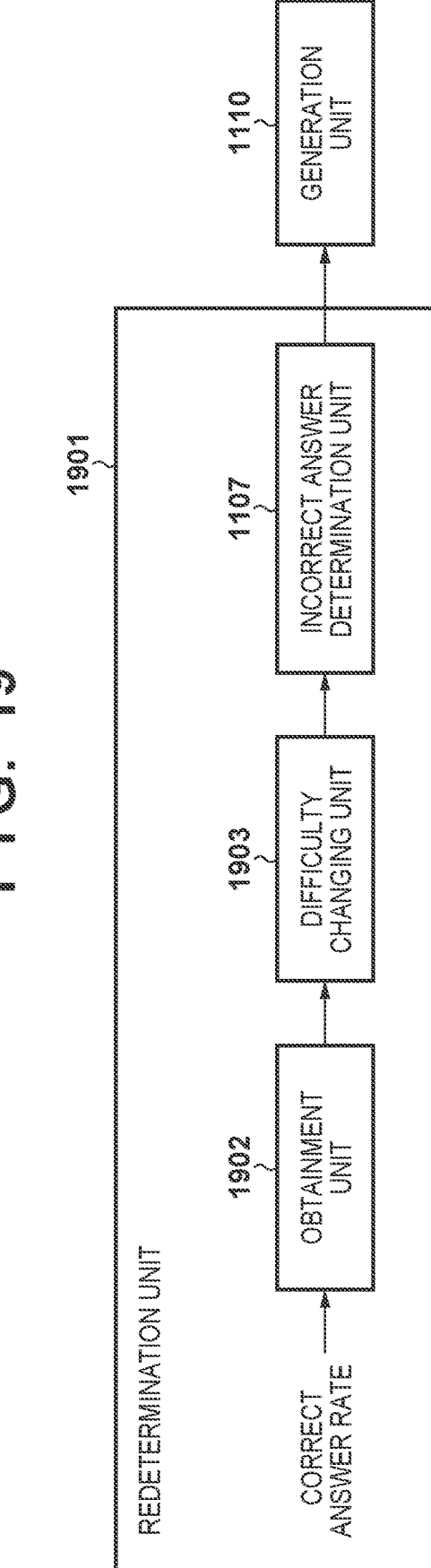

F I G. 20
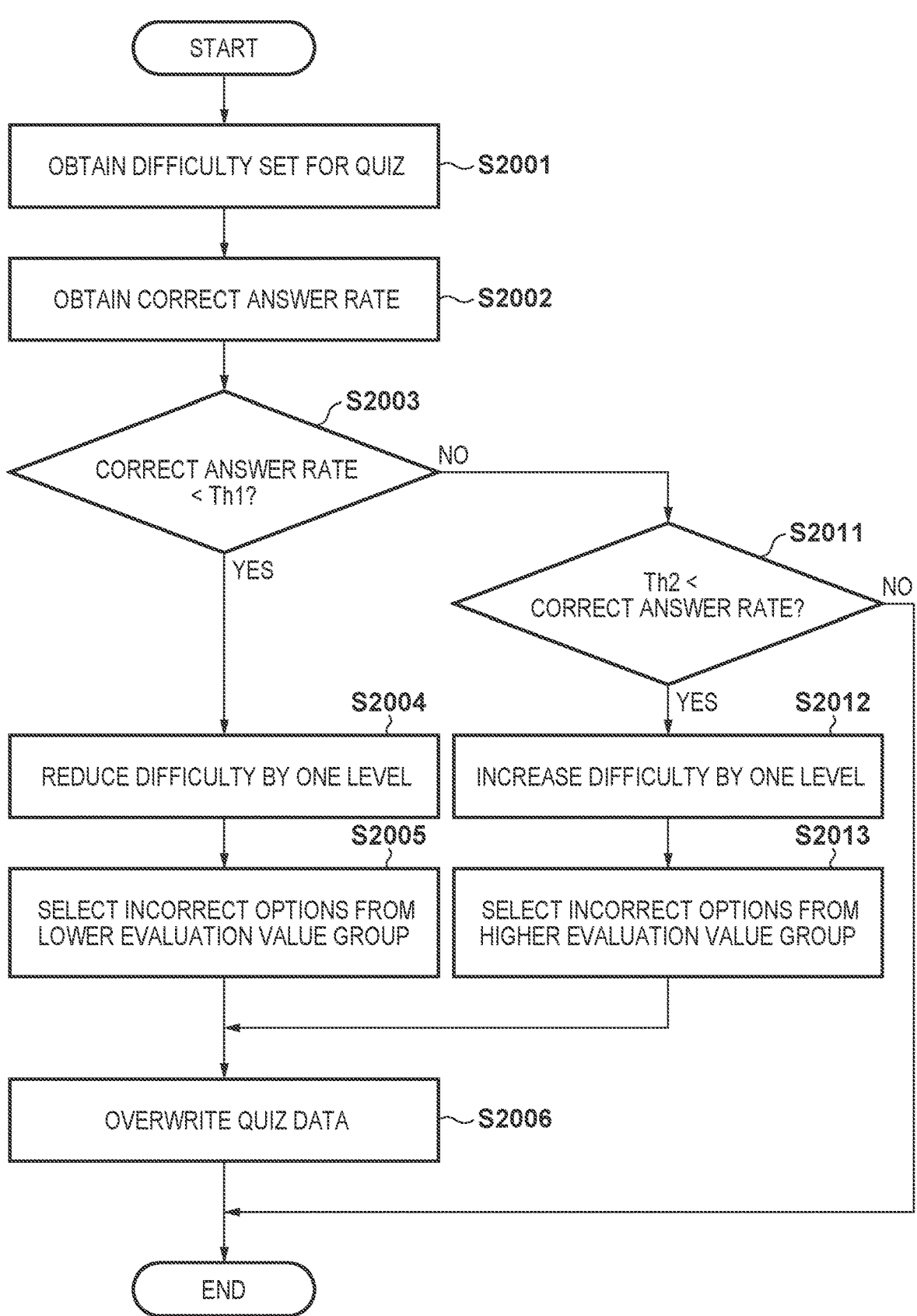

FIG. 21

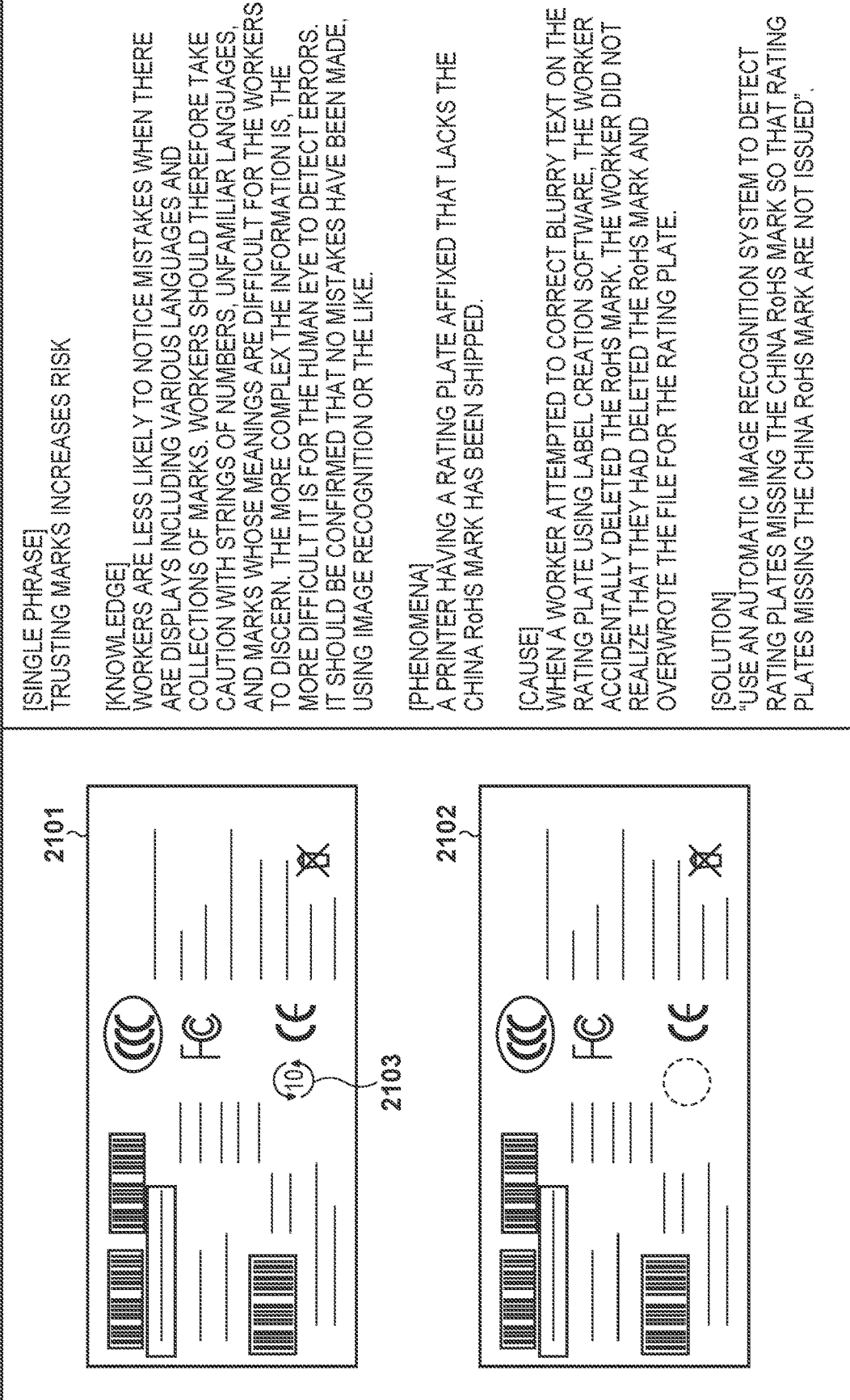

[SINGLE PHRASE]
TRUSTING MARKS INCREASES RISK

[KNOWLEDGE]
WORKERS ARE LESS LIKELY TO NOTICE MISTAKES WHEN THERE
ARE DISPLAYS INCLUDING VARIOUS LANGUAGES AND
COLLECTIONS OF MARKS. WORKERS SHOULD THEREFORE TAKE
CAUTION WITH STRINGS OF NUMBERS, UNFAMILIAR LANGUAGES,
AND MARKS WHOSE MEANINGS ARE DIFFICULT FOR THE WORKERS
TO DISCERN. THE MORE COMPLEX THE INFORMATION IS, THE
MORE DIFFICULT IT IS FOR THE HUMAN EYE TO DETECT ERRORS.
IT SHOULD BE CONFIRMED THAT NO MISTAKES HAVE BEEN MADE,
USING IMAGE RECOGNITION OR THE LIKE.

[PHENOMENA]
A PRINTER HAVING A RATING PLATE AFFIXED THAT LACKS THE
CHINA RoHS MARK HAS BEEN SHIPPED.

[CAUSE]
WHEN A WORKER ATTEMPTED TO CORRECT BLURRY TEXT ON THE
RATING PLATE USING LABEL CREATION SOFTWARE, THE WORKER
ACCIDENTALLY DELETED THE RoHS MARK. THE WORKER DID NOT
REALIZE THAT THEY HAD DELETED THE RoHS MARK AND
OVERWROTE THE FILE FOR THE RATING PLATE.

[SOLUTION]
"USE AN AUTOMATIC IMAGE RECOGNITION SYSTEM TO DETECT
RATING PLATES MISSING THE CHINA RoHS MARK SO THAT RATING
PLATES MISSING THE CHINA RoHS MARK ARE NOT ISSUED".

Figure 22:
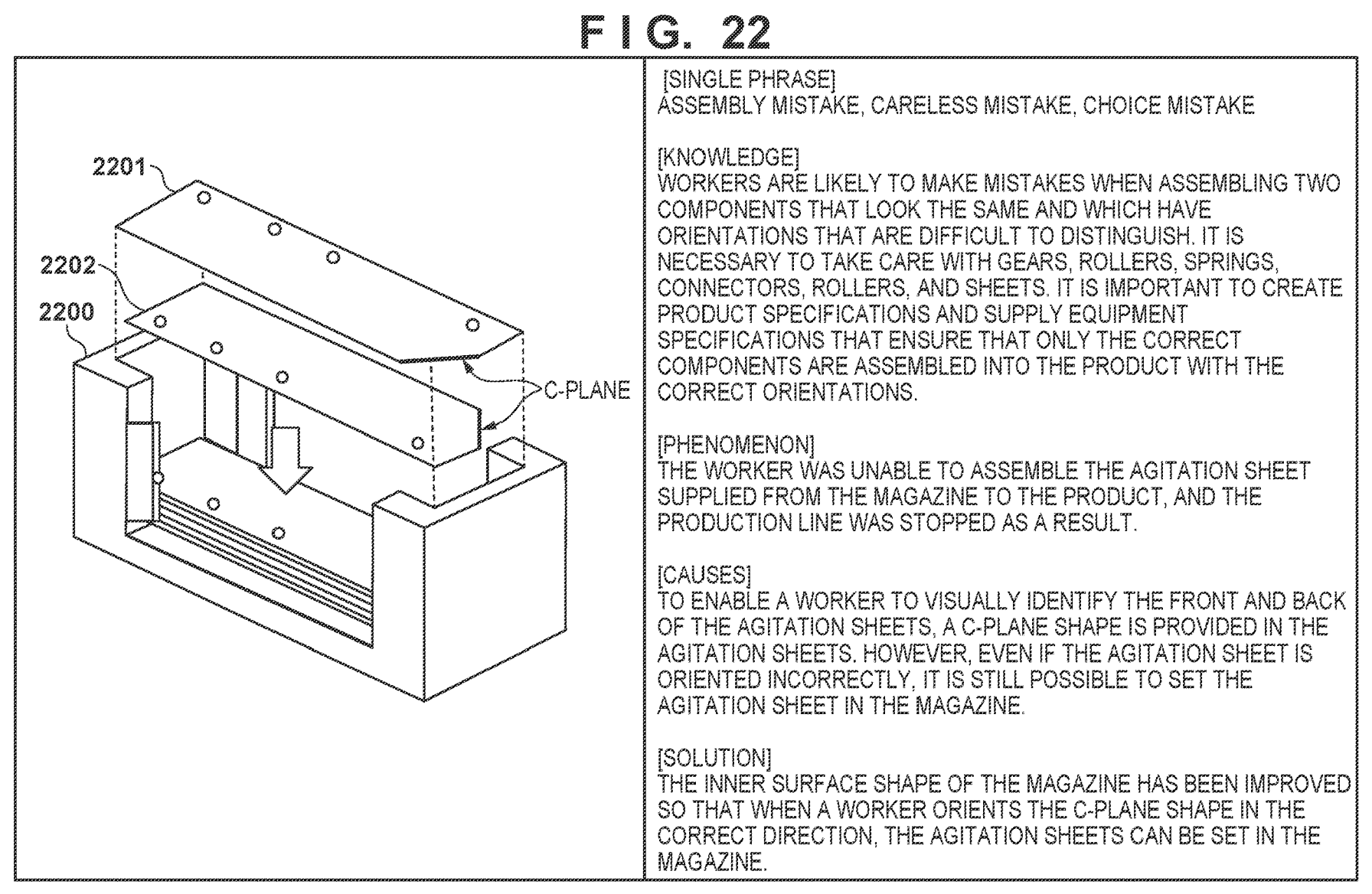

[SINGLE PHRASE]
ASSEMBLY MISTAKE, CARELESS MISTAKE, CHOICE MISTAKE

[KNOWLEDGE]
WORKERS ARE LIKELY TO MAKE MISTAKES WHEN ASSEMBLING TWO
COMPONENTS THAT LOOK THE SAME AND WHICH HAVE
ORIENTATIONS THAT ARE DIFFICULT TO DISTINGUISH. IT IS
NECESSARY TO TAKE CARE WITH GEARS, ROLLERS, SPRINGS,
CONNECTORS, ROLLERS, AND SHEETS. IT IS IMPORTANT TO CREATE
PRODUCT SPECIFICATIONS AND SUPPLY EQUIPMENT
SPECIFICATIONS THAT ENSURE THAT ONLY THE CORRECT
COMPONENTS ARE ASSEMBLED INTO THE PRODUCT WITH THE
CORRECT ORIENTATIONS.

[PHENOMENON]
THE WORKER WAS UNABLE TO ASSEMBLE THE AGITATION SHEET
SUPPLIED FROM THE MAGAZINE TO THE PRODUCT, AND THE
PRODUCTION LINE WAS STOPPED AS A RESULT.

[CAUSES]
TO ENABLE A WORKER TO VISUALLY IDENTIFY THE FRONT AND BACK
OF THE AGITATION SHEETS, A C-PLANE SHAPE IS PROVIDED IN THE
AGITATION SHEETS. HOWEVER, EVEN IF THE AGITATION SHEET IS
ORIENTED INCORRECTLY, IT IS STILL POSSIBLE TO SET THE
AGITATION SHEET IN THE MAGAZINE.

[SOLUTION]
THE INNER SURFACE SHAPE OF THE MAGAZINE HAS BEEN IMPROVED
SO THAT WHEN A WORKER ORIENTS THE C-PLANE SHAPE IN THE
CORRECT DIRECTION, THE AGITATION SHEETS CAN BE SET IN THE
MAGAZINE.

C-PLANE

Figure 23:
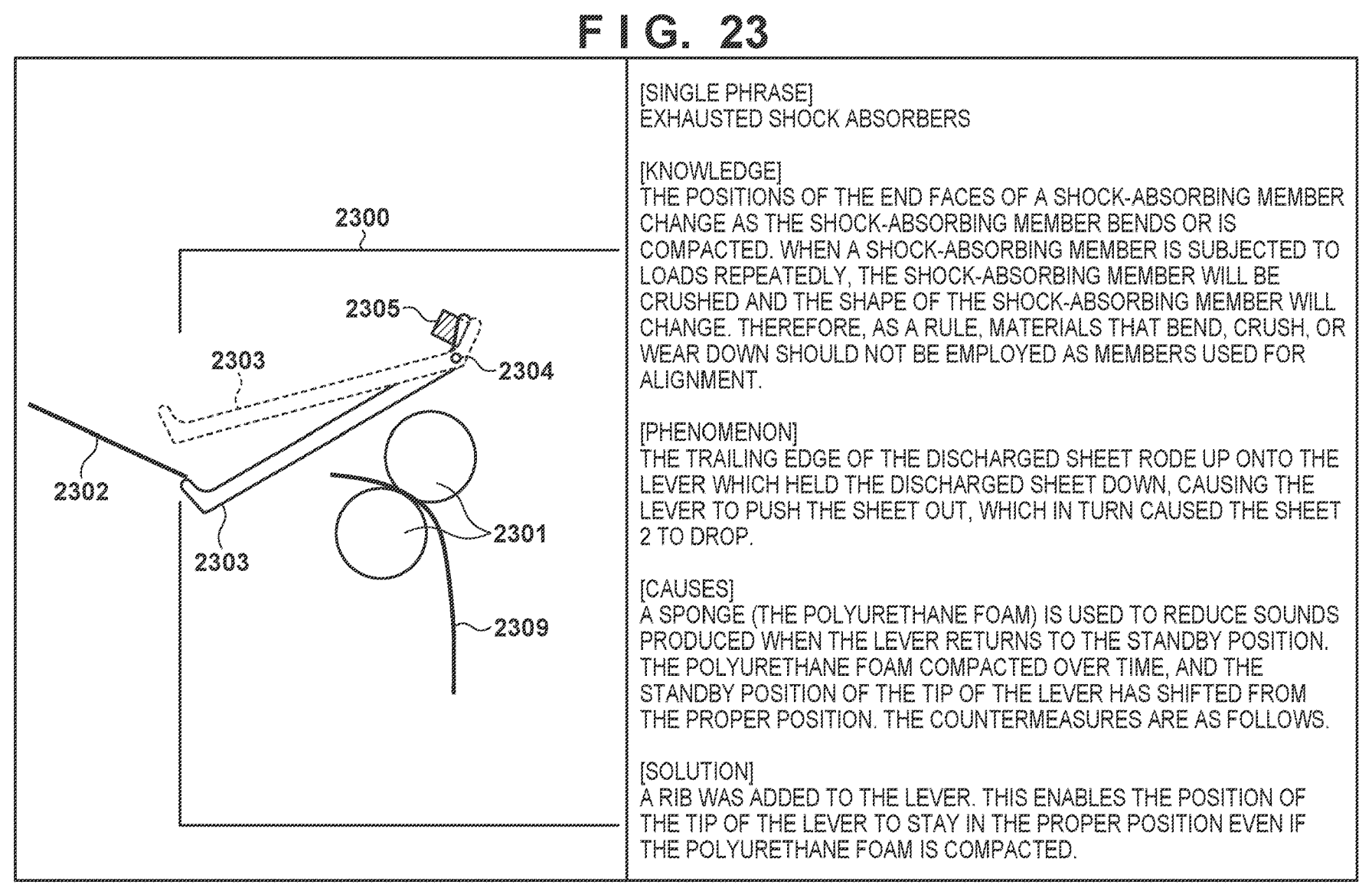

[SINGLE PHRASE]
EXHAUSTED SHOCK ABSORBERS

[KNOWLEDGE]
THE POSITIONS OF THE END FACES OF A SHOCK-ABSORBING MEMBER CHANGE AS THE SHOCK-ABSORBING MEMBER BENDS OR IS COMPACTED. WHEN A SHOCK-ABSORBING MEMBER IS SUBJECTED TO LOADS REPEATEDLY, THE SHOCK-ABSORBING MEMBER WILL BE CRUSHED AND THE SHAPE OF THE SHOCK-ABSORBING MEMBER WILL CHANGE. THEREFORE, AS A RULE, MATERIALS THAT BEND, CRUSH, OR WEAR DOWN SHOULD NOT BE EMPLOYED AS MEMBERS USED FOR ALIGNMENT.

[PHENOMENON]
THE TRAILING EDGE OF THE DISCHARGED SHEET RODE UP ONTO THE LEVER WHICH HELD THE DISCHARGED SHEET DOWN, CAUSING THE LEVER TO PUSH THE SHEET OUT, WHICH IN TURN CAUSED THE SHEET 2 TO DROP.

[CAUSES]
A SPONGE (THE POLYURETHANE FOAM) IS USED TO REDUCE SOUNDS PRODUCED WHEN THE LEVER RETURNS TO THE STANDBY POSITION. THE POLYURETHANE FOAM COMPACTED OVER TIME, AND THE STANDBY POSITION OF THE TIP OF THE LEVER HAS SHIFTED FROM THE PROPER POSITION. THE COUNTERMEASURES ARE AS FOLLOWS.

[SOLUTION]
A RIB WAS ADDED TO THE LEVER. THIS ENABLES THE POSITION OF THE TIP OF THE LEVER TO STAY IN THE PROPER POSITION EVEN IF THE POLYURETHANE FOAM IS COMPACTED.

F I G. 24
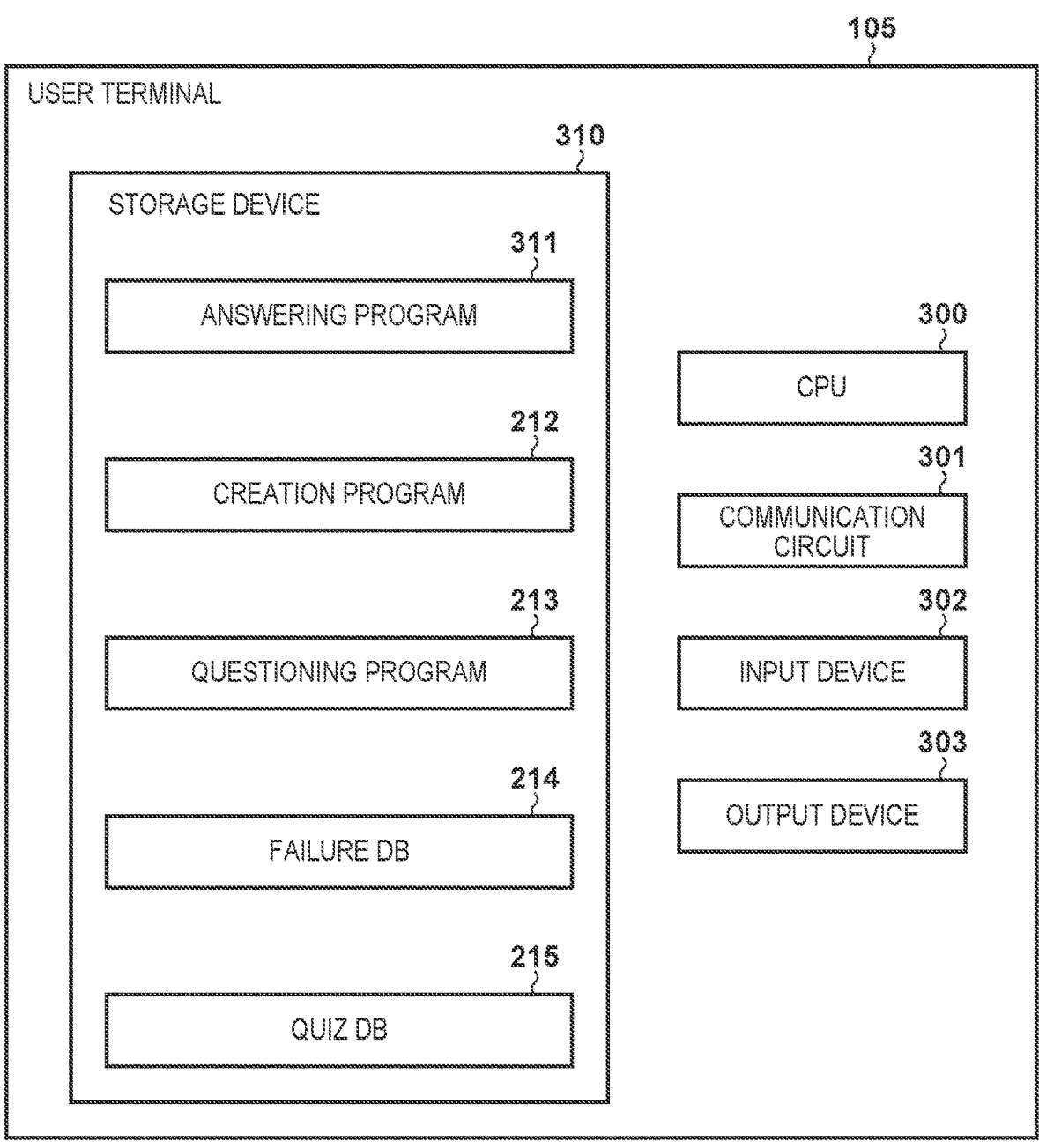

F I G. 25
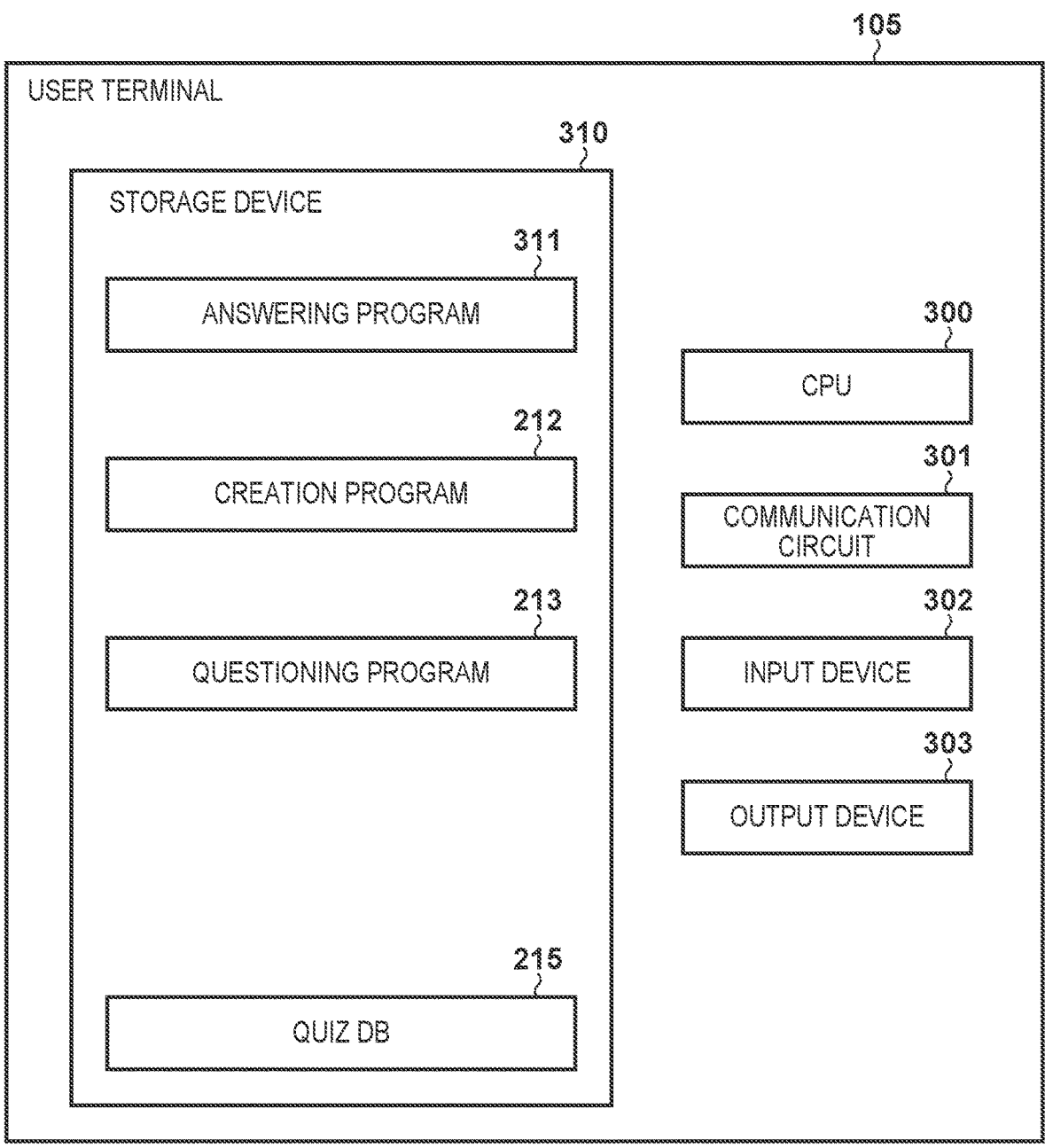

F I G. 26
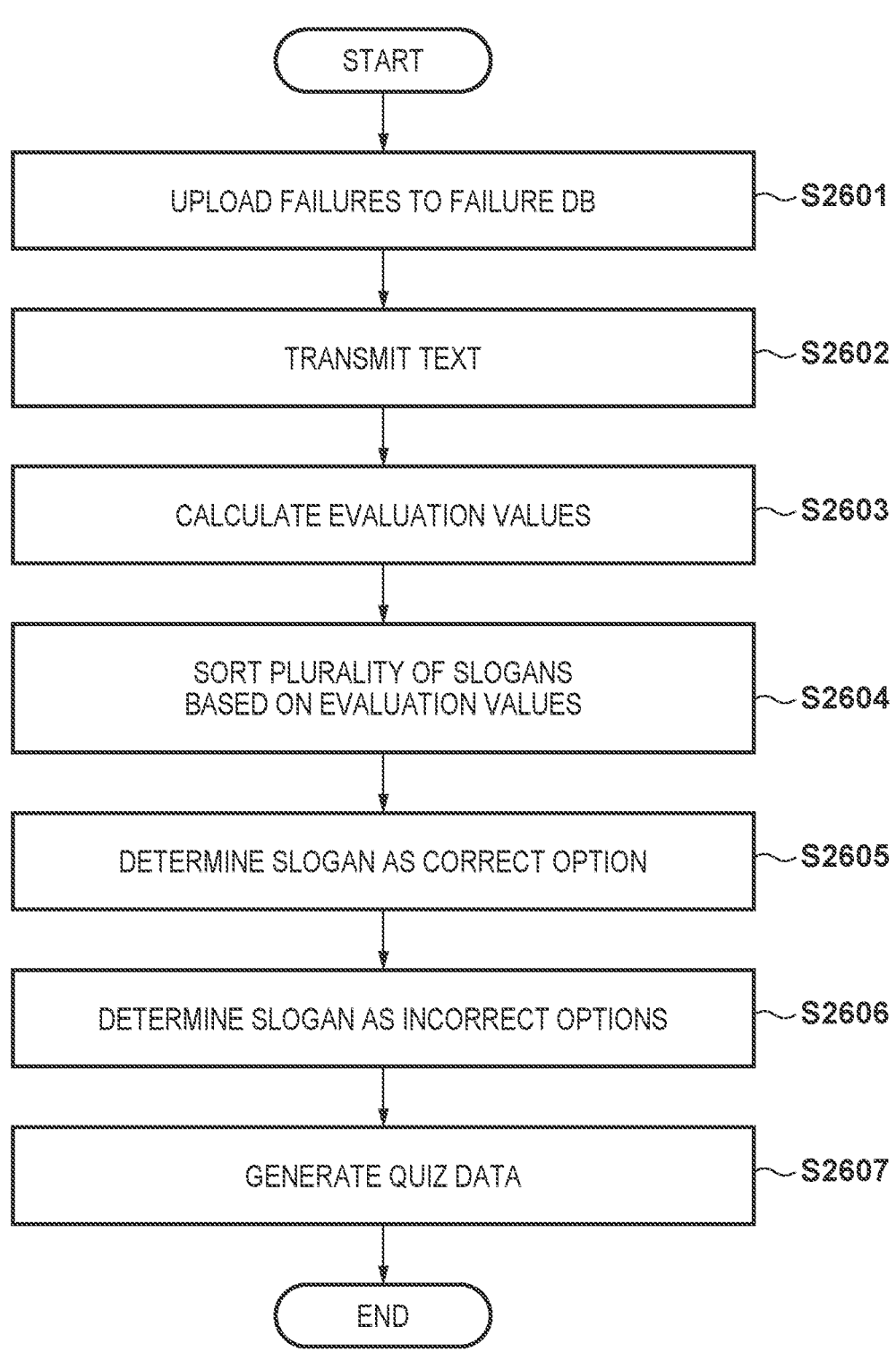

F I G. 27
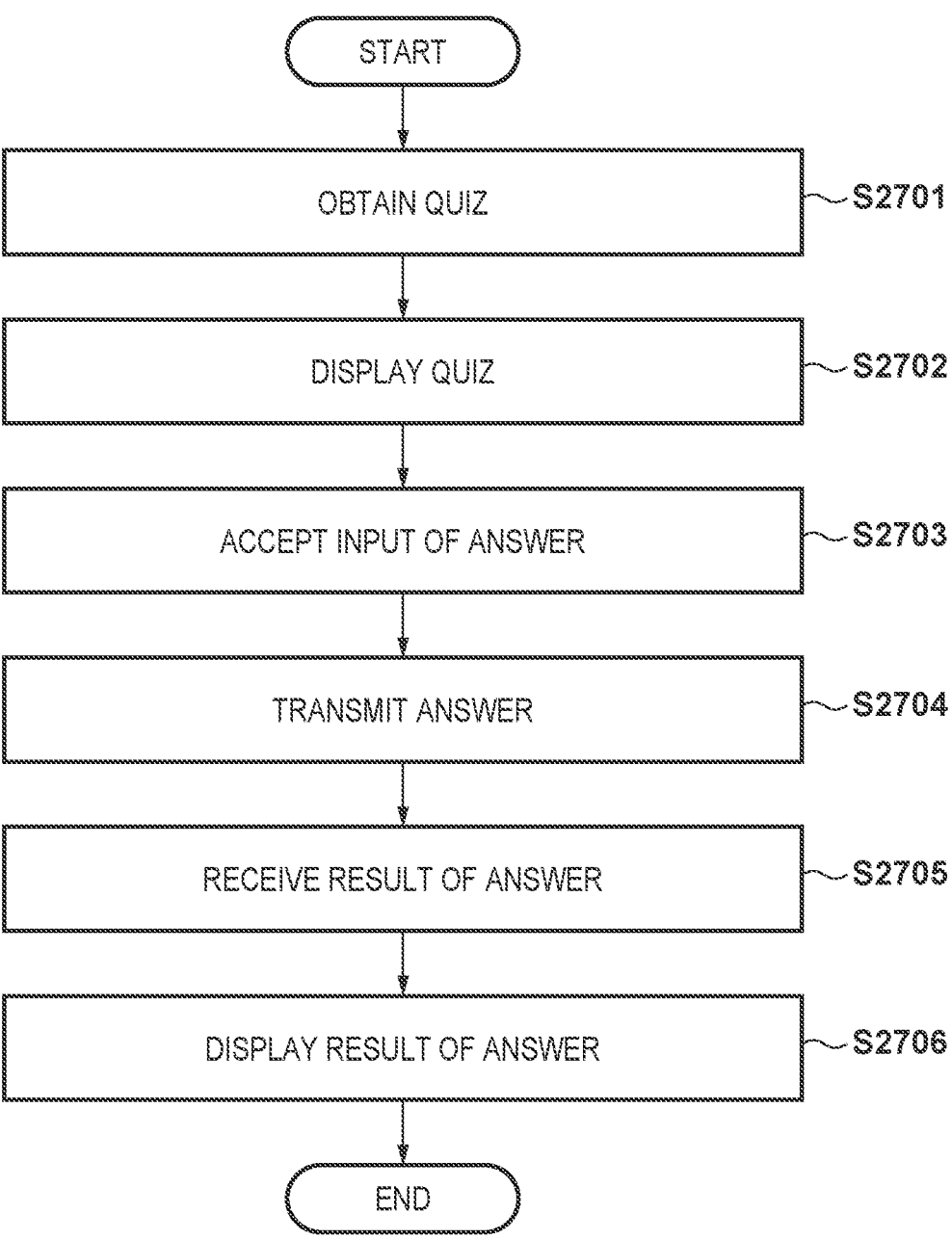

LEARNING SUPPORT APPARATUS FOR CREATING MULTIPLE-CHOICE QUIZ

BACKGROUND OF THE INVENTION

Field of the Invention

The present invention relates to a learning support apparatus for creating a multiple-choice quiz.

Description of the Related Art

Japanese Patent Laid-Open No. 2002-014990 proposes a question answering system that, when a user enters a question sentence in natural language, generates an answer sentence to the question sentence. Specifically, the entered answer sentence is checked against sentences stored in a database (extracted sentences), and if there is no match, the answer sentence and the extracted sentences are transformed, the sentences are checked again, and a single answer sentence is created by repeating this process.

Incidentally, companies and the like sometimes create databases of failures, and new employees and the like learn from these failures. Increasing the efficiency of learning in a short period of time requires more appropriate question sentences and answer sentences. A multiple-choice quiz, which requires a user to choose a correct option from a plurality of options, is suited to enabling the user to learn from failures. Past techniques have merely generated a single answer sentence, and have not been able to generate a multiple-choice quiz. In particular, it has been difficult to generate false options (incorrect options).

SUMMARY OF THE INVENTION

The present disclosure provides a learning support apparatus for creating a multiple-choice quiz, the learning support apparatus comprising: a storage device configured to store, in advance, a plurality of failures and a plurality of lessons obtained from corresponding ones of the plurality of failures; and at least one processor configured to perform operations including: an accepting operation of accepting input of text serving as a question sentence in the multiple-choice quiz; a computing operation of computing an evaluation value for a consistency between the text accepted in the accepting operation and each of the plurality of lessons stored in the storage device; and a determination operation of determining one lesson to serve as a correct option in the multiple-choice quiz and at least one lesson to serve as an incorrect option in the multiple-choice quiz, based on the evaluation value for each of the plurality of lessons computed in the computing operation.

Further features of the present invention will become apparent from the following description of exemplary embodiments (with reference to the attached drawings).

BRIEF DESCRIPTION OF THE DRAWINGS

FIG. 2 is a diagram illustrating a learning support apparatus.

FIG. 3 is a diagram illustrating a user terminal.

FIG. 4 is a diagram illustrating a failure database.

FIG. 6 is a diagram illustrating morphological analysis.

FIG. 7 is a diagram illustrating evaluation values and sorting.

FIG. 8 is a diagram illustrating a difficulty selection screen.

FIG. 9 is a diagram illustrating the grouping of slogans according to difficulty and a method for selecting an option.

FIG. 10 is a diagram illustrating a quiz screen.

FIG. 11 is a diagram illustrating a creation device.

FIG. 13 is a flowchart illustrating a creation method.

FIG. 14 is a flowchart illustrating a method for determining an incorrect option.

FIG. 15 is a flowchart illustrating a questioning method for a quiz.

FIG. 16 is a flowchart illustrating a method for adjusting options.

FIG. 17 is a diagram illustrating a preview screen.

FIG. 18 is a diagram illustrating a changing screen.

FIG. 19 is a diagram illustrating a redetermination unit.

FIG. 20 is a diagram illustrating a method for redetermining options.

FIG. 21 is a diagram illustrating an example of lesson extraction.

FIG. 22 is a diagram illustrating an example of lesson extraction.

FIG. 23 is a diagram illustrating an example of lesson extraction.

FIG. 24 is a diagram illustrating another user terminal.

FIG. 25 is a diagram illustrating another user terminal.

FIG. 26 is a flowchart including a method for producing the learning support system.

FIG. 27 is a flowchart illustrating an answering method for a quiz.

DESCRIPTION OF THE EMBODIMENTS

Figure 1:
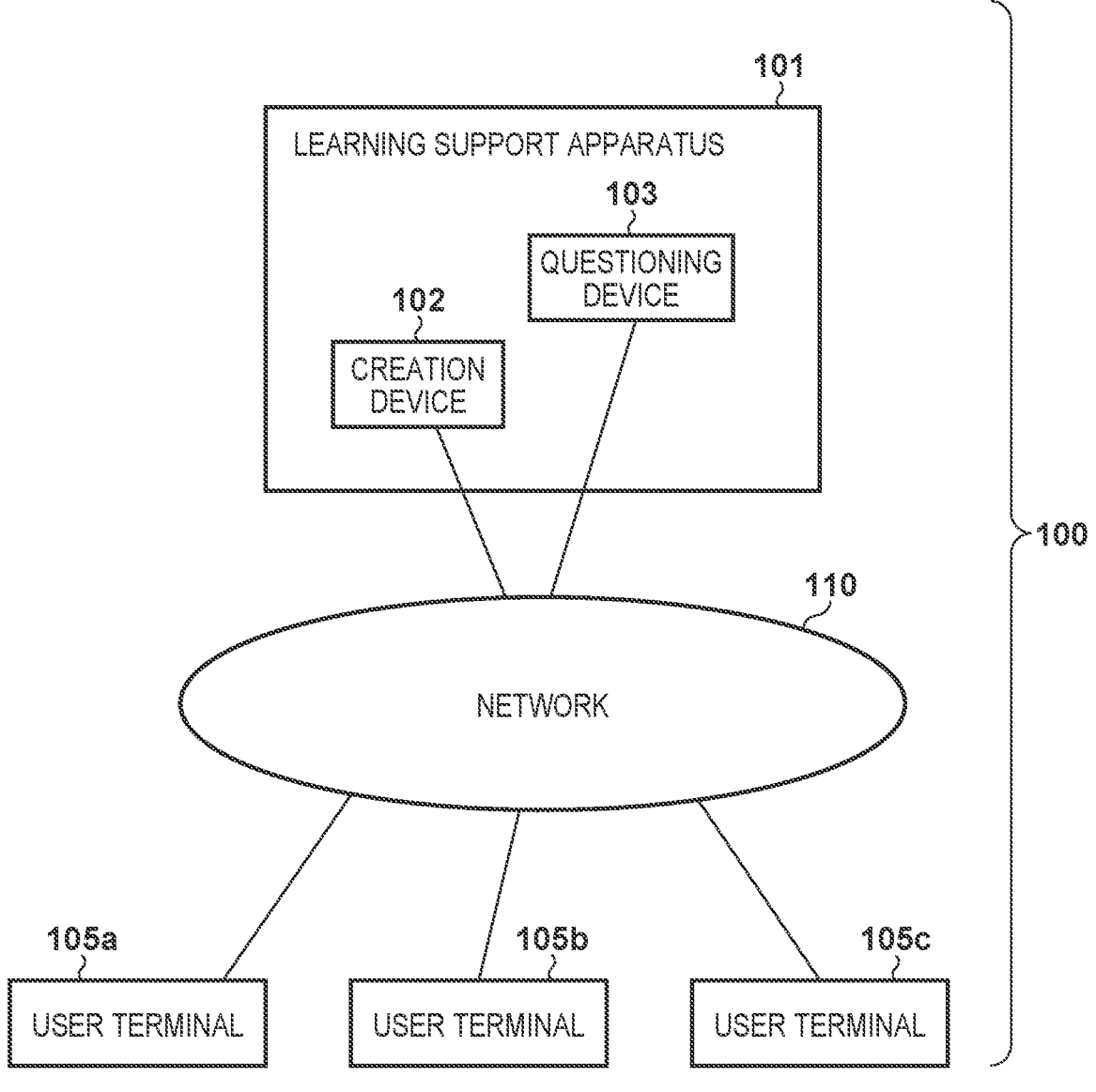
FIG. 1 is a diagram illustrating a learning support system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment (1) Learning Support System

FIG. 1 illustrates a learning support system 100. A learning support apparatus 101 is a personal computer (PC) or a server computer, and may be called an "information processing apparatus". The learning support apparatus 101 includes a creation device 102 and a questioning device 103. The creation device 102 and the questioning device 103 may be physically implemented by a single computer, or by different computers. The creation device 102 is a computer that creates a quiz from a collection of failures stored in advance. The questioning device 103 is a computer that issues a quiz to user terminals 105a to 105c. The learning support apparatus 101 and the user terminals 105a to 105c are connected over a network 110. The network 110 can include the Internet, local area networks (LANs), cellular networks, and the like. The user terminals 105a to 105c are computers used by respondents who answer the quiz. The user terminals 105a to 105c are, for example, PCs, smartphones, or tablet computers. Although three user terminals 105a to 105c are illustrated as examples here, the number of user terminals may be any number greater than or equal to 1. When describing matters common to the user terminals 105a to 105c, the user terminals 105a to 105c may be referred to as "user terminal 105".

(2) Learning Support Apparatus

FIG. 2 illustrates the hardware of the learning support apparatus 101. A CPU 200 includes at least one processor (processing circuitry) that implements various functions in accordance with programs stored in a storage device 210. A communication circuit 201 includes at least one of a wired communication circuit and a wireless communication circuit for communicating with another computer over the network 110. An input device 202 includes a keyboard, a touch sensor, a microphone, a pointing device, and the like. An output device 203 includes a sound output circuit that outputs voice or sound and a display device the displays visual information. The storage device 210 includes a read-only memory (ROM), a random access memory (RAM), a hard disk drive (HDD), a solid-state drive (SSD), and the like.

The storage device 210 stores various programs and data. A web server program 211 is a program that provides a web-based user interface to a creator of a quiz and a respondent to the quiz. Although a web-based learning support system 100 is described as an example here, this is merely one example. The learning support system 100 may be a server-client computer system that is not web-based. A creation program 212 is a program that creates quiz data for learning failures based on a failure DB 214 stored in the storage device 210, and registers the quiz data in a quiz DB 215. "DB" is an acronym for "database". The quiz DB 215 holds various quiz data. The quiz data includes text that forms the quiz and a quiz screen. The quiz screen is constituted by, for example, HTML files, image data, CSS data, and the like. "HTML" is an acronym for "HyperText Markup Language". "CSS" is an acronym for "Cascading Style Sheet". A user DB 216 stores user authentication information (login IDs and passwords), quiz results for each user, and the like.

(3) User Terminal

FIG. 3 illustrates the hardware of the user terminal 105. A CPU 300 includes at least one processor (processing circuitry) that implements various functions in accordance with programs stored in a storage device 310. A communication circuit 301 includes at least one of a wired communication circuit and a wireless communication circuit for communicating with another computer over the network 110. An input device 302 includes a keyboard, a touch sensor, a microphone, a pointing device, and the like. An output device 303 includes a sound output circuit that outputs voice or sound and a display device the displays visual information. The storage device 310 includes a read-only memory (ROM), a random access memory (RAM), a hard disk drive (HDD), a solid-state drive (SSD), and the like.

The storage device 310 stores various programs and data. An answering program 311 is a program that receives quiz data issued by the questioning device 103, displays a quiz screen based on the quiz data in the output device 303, and transmits answers entered from the input device 302 to the questioning device 103. When the quiz screen is web-based, the answering program 311 may be a web browser program.

(4) Failure DB

FIG. 4 illustrates an example of information stored in the failure DB 214. "Single phrase (slogan)" is an educational suggestion (e.g., a saying or a slogan) extracted from a failure formed in the past. Generally speaking, multiple failures have common phenomena, causes, or countermeasures. Accordingly, educational suggestions common to multiple failures are extracted as single phrases and stored in the failure DB 214. "Knowledge" is descriptive text describing the failure, and includes text describing the phenomena, causes, countermeasures, and the like for the failure. "Tag information" is optional information, and includes multiple terms related to the phenomena, causes, and countermeasures for the failure.

The single phrase "don't judge by appearance", which describes a specific failure, suggest, for example, that similarities in the appearances of multiple components can result in an assembly worker installing the wrong component on the main body of a product. The knowledge "similar things in close proximity can be mistaken for each other" suggests, for example, that if multiple components having similar appearances are in close proximity, the assembly worker may pick up the wrong component. In this manner, the knowledge includes an explanation of the single phrase.

"Trusting marks increases risk" suggests, for example, that numbers whose meaning is difficult to discern, text written in an unfamiliar language, and missing or incorrect marks are difficult to notice.

"Don't trust preconceptions" suggests, for example, that becoming caught up in preconceptions or assumptions makes it difficult to notice mistakes.

"Spreading responsibility creates dire consequences" suggests that when several people are working together and rely on each other too much, it is difficult to notice mistakes.

"Stop and resume, start and regret" suggests, for example, that when work is interrupted, the worker will forget or misunderstand the progress of the work during the interruption, making it more likely that tasks will be omitted.

"People grow accustomed, for better or worse" suggests, for example, that as a worker grows accustomed to a particular task, they carry out the specific task more and more automatically, making them prone to mistakes.

(6) Multiple-choice quiz Creation Method (6-1) Basic Concept

The present embodiment introduces a method for creating a multiple-choice quiz suitable for users to learn about failures. Single phrases and knowledge extracted from various failures are stored in the failure DB 214. Accordingly, the creation device 102 creates a quiz for teaching users single phrases suitable for new failures (phenomena, causes, and countermeasures). The creation device 102 reads out the single phrase most suited to a phenomenon, cause, and countermeasure entered by the user as a correct option from the failure DB 214.

Furthermore, the creation device 102 automatically creates incorrect options in the quiz. For example, at least one incorrect option is determined from remaining single phrases excluding the single phrase determined as the correct option.

(6-2) Entering Text Serving as Basis of Question Sentence

Figure 5:
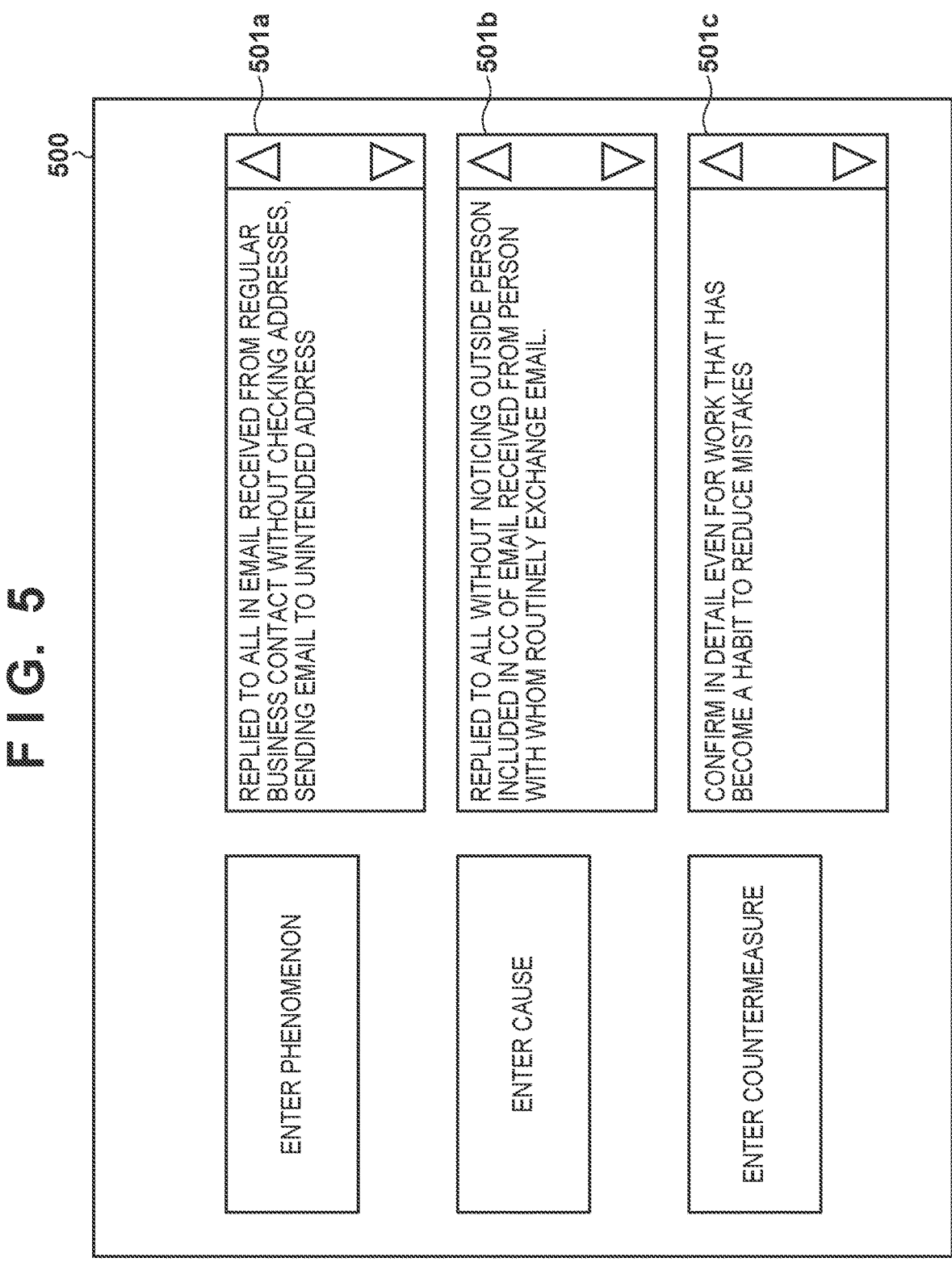
FIG. 5 is a diagram illustrating an input screen 500.

FIG. 5 illustrates an input screen 500 displayed in the output device 203 of the learning support apparatus 101 (the creation device 102). The input screen 500 includes text boxes 501a to 501c. The text box 501a is an object for accepting the input of descriptive text describing a phenomenon that results in a failure. The text box 501b is an object for accepting the input of descriptive text describing a cause of a failure. The text box 501c is an object for accepting the input of descriptive text describing a countermeasure for preventing a failure. The user enters the descriptive text by operating the input device 202.

(6-3) Evaluation Value Computation

As illustrated in FIG. 6, the CPU 200 of the creation device 102 breaks down the entered descriptive text into terms (through morphological analysis or the like). The CPU 200 compares a plurality of terms extracted from the descriptive text with the single phrases, knowledge, and tag information registered in the failure DB 214, and computes an evaluation value for each single phrase. TF-IDF can be used as a method for computing the evaluation values, for example. "TF" is an acronym for "term frequency" (the frequency with which terms appear). In other words, TF indicates the frequency of appearance of a given term in a given sentence. TF can be obtained by dividing the number of appearances of a given term by the total number of terms.

$$TF=(\text{number of appearances of a given term})/\text{total number of terms in a given document} \qquad \text{Eq1}$$

For example, assume that the terms "people" and "habitual" have been extracted from a document entered by the user. In addition, the single phrase "people grow accustomed, for better or worse" and the knowledge "people perform habitual tasks automatically" are registered for the first sentence in the failure DB 214. In this case, the TF of the term "people" is obtained as follows. The total number of terms in the single phrase and the knowledge for this failure is 8. Note that although the term "people" appears twice, the number of terms for the term "people" is counted as 1. Accordingly, the TF for the term "people" is 0.25. Likewise, the TF of the term "habitual" is 0.125. "People" is therefore a more important term than "habitual".

"IDF" is an acronym for "inverse document frequency". The IDF is a measure of how many documents a term is used in. Terms having a high frequency of appearance are not evaluated is important terms. However, a term that appears only in a specific document is evaluated as an important term. The IDF is computed through the following equation.

$$IDF=\log(\text{total number of documents}/\text{number of documents in which given term is present})+1 \qquad \text{Eq2}$$

For example, assume the total number of documents is two, the term "people" appears in two documents, and the term "habitual" appears in one document. The second document is constituted by the single phrase "lots of information is too much" and the knowledge "there is a limit to how much information people can process at one time". In this case, the IDF of the term "people" is 1. The IDF of the term "habitual" is 1.3.

The TF-IDF is an index indicating that the more frequently a term appears in a given document (a high TF) and the less frequently the term appears in all documents (a higher IDF), the more important the term is.

$$TF\text{-}IDF=TF \times IDF \qquad \text{Eq3}$$

The TF-IDF for the term "people" is 0.25×1=0.25. The TF-IDF for the term "habitual" is 0.125×1.3=0.1625.

An evaluation value E is obtained for each failure (for each single phrase). Here, the evaluation value E is obtained for two failures (documents).

$$E=TF\text{-}IDF \text{ (people) for term "people"}+TF\text{-}IDF \text{ for term "habitual"} \qquad \text{Eq4}$$

Accordingly, the evaluation value E for the first document is 0.25+0.1625=0.4125. The evaluation value E for the second document is 0.25. Accordingly, it can be seen that the first sentence (single phrase) is closer to the sentence (phenomenon, cause, and countermeasure) entered by the user than the second sentence (single phrase).

(6-4) Sorting Single Phrases and Determining Correct Option

FIG. 7 illustrates an example of the evaluation value E obtained for each single phrase. Column 701 in FIG. 7 indicates the evaluation value E. The CPU 200 sorts the plurality of single phrases registered in the failure DB 214 based on the evaluation values of the plurality of single phrases. In this example, single phrases having higher evaluation values are positioned at the top, and single phrases having lower evaluation values are positioned at the bottom. Although the evaluation value E is computed through the TF-IDF method, another evaluation method may be used instead. In other words, any evaluation method in which the evaluation value of a single phrase suited to the phenomenon, cause, and countermeasure entered is higher, and the evaluation value of a single phrase not suited to the phenomenon, cause, and countermeasure is lower, may be used. In this example, the single phrase "people grow accustomed, for better or worse" has the highest evaluation value. Accordingly, the single phrase "people grow accustomed, for better or worse" is determined to be the correct option in the multiple-choice quiz.

(6-5) Determining Incorrect Options

As a method for determining incorrect options, there is a method which, for example, selects m single phrases at random from n−1 single phrases, the n−1 single phrases being the remaining single phrases among n single phrases excluding the correct option. In this case, the total number of options in the quiz is m+1. If m=2, the CPU 200 excludes the correct option from the seven single phrases in the sorted list illustrated in FIG. 7 to create a sublist containing six single phrases. The CPU 200 furthermore randomly selects two single phrases from the six single phrases.

Alternatively, a method in which the incorrect option is selected according to the difficulty selected by the user or the like is conceivable.

FIG. 8 illustrates a difficulty selection screen 800. The difficulty selection screen 800 is displayed in the output device 203. A radio button 801$a$ is a button for selecting a method for determining the incorrect options based on the difficulty. A radio button 801$b$ is a button for selecting a method for determining the incorrect options randomly, regardless of the difficulty.

A radio button 802 is a button for selecting the difficulty. Although this example illustrates three levels of difficulty, any configuration is acceptable as long as at least two levels of difficulty can be selected.

The CPU 200 classifies the m single phrases in the sublist according to a number of levels k for the difficulty. The number of levels k is, for example, the total number of levels of difficulty. If the difficulty is one of three levels (high, medium, and low), k=3.

FIG. 9 illustrates single phrases grouped according to difficulty when k=3. Column 901 indicates a type of the option. In this example, two single phrases having evaluation values E of 0.38 and 0.22 are classified as incorrect options for the high difficulty. Two single phrases having evaluation values E of 0.19 and 0.17 are classified as incorrect options for the medium difficulty. Two single phrases having evaluation values E of 0.06 and 0.05 are classified as incorrect options for the low difficulty. In this manner, when the difficulty is high, another single phrase for a concept close to the concept of the correct option is selected. When the difficulty is low, another single phrase for a concept far from the concept of the correct option is selected.

(6-6) Quiz Screen Creation

FIG. 10 illustrates an example of a quiz screen 1000. Question text 1001 is a fixed message which indicates how to answer the quiz. Phenomenon descriptive text 1002 is text that describes a phenomenon, which is one of three elements constituting the failure. Normally, the descriptive text of a phenomenon entered by the user through the input screen 500 is displayed in the phenomenon descriptive text 1002. Options 1003 include the correct option and incorrect options. This example contains two incorrect options. The CPU 200 randomly rearranges the correct options and at least one incorrect option determined based on the evaluation values, and places the options in the options 1003. The placement of the correct option and the incorrect options in the options 1003 may be determined at the time the question is issued by the questioning device 103. Answer buttons 1004 are buttons for selecting the option that the user believes is the correct answer. One answer button 1004 is provided for each option.

(7) CPU Functions

FIG. 11 illustrates the functions implemented by the CPU 200 of the learning support apparatus 101 (creation device 102) executing the creation program 212. An accepting unit 1101a displays the input screen 500 in the output device 203 and accepts text (phenomena, causes, and countermeasures) entered through the input screen 500. An accepting unit 1101b accepts the designation of the selection method (by difficulty or random) and the difficulty. A determination unit 1102 determines the correct option and the incorrect options. An extraction unit 1103 extracts terms from the phenomena, causes, and countermeasures. An evaluation unit 1104 computes the evaluation value for each single phrase based on the extracted terms and the failure DB 214. A sorting unit 1105 sorts the plurality of single phrases registered in the failure DB 214 based on the evaluation values. A correct answer selection unit 1106 selects one single phrase from the plurality of single phrases registered in the failure DB 214 as the correct option based on the evaluation values. An incorrect answer selection unit 1107 selects at least one single phrase from the plurality of single phrases registered in the failure DB 214 as incorrect options. As described above, the incorrect answer selection unit 1107 takes the number m of incorrect options and the selection method as inputs, and selects m single phrases as incorrect options from the n−1 single phrases excluding the correct option. When the random method is selected, the incorrect answer selection unit 1107 randomly selects m single phrases from the n−1 single phrases. When the difficulty-based method is selected, the incorrect answer selection unit 1107 divides the n−1 single phrases into k groups according to the number k of difficulties, and randomly selects m single phrases from an i-th group corresponding to a difficulty i selected by the user. A number j of single phrases in the i-th group is at least m. If m<j, the incorrect answer selection unit 1107 may randomly select m single phrases from the j single phrases.

A generation unit 1110 generates the quiz screen 1000. For example, the generation unit 1110 assigns identification information to distinguish each quiz, and associates the quiz data with screen data of the quiz screen 1000 for that identification information. The screen data includes HTML file templates, CSS data templates, and image data. The quiz data includes identification information for the text displayed in the phenomenon descriptive text 1002, and identification information for the text displayed in the options 1003. The quiz DB holds this data in association with the quiz identification information.

Figure 12:
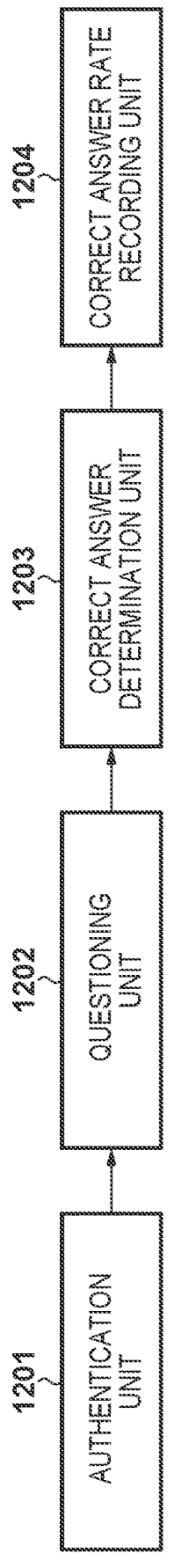
FIG. 12 is a diagram illustrating a questioning device.

FIG. 12 illustrates the functions implemented by the CPU 200 of the learning support apparatus 101 (questioning device 103) executing the creation program 212. An authentication unit 1201, which is optional, determines whether a user ID and password entered by the user operating the user terminal 105 are registered in the user DB 216. A questioning unit 1202 selects one quiz from the plurality of quizzes registered in the quiz DB 215 and transmits display data (e.g., HTML files and the like) to the user terminal 105 for displaying the quiz screen 1000 in the user terminal 105. A correct answer determination unit 1203 determines whether the answer button 1004 operated in the user terminal 105 is the button associated with the correct option. When the user selects the correct option, the questioning unit 1202 may display a correct answer screen in the user terminal 105. When the user selects an incorrect option, the questioning unit 1202 may display an incorrect answer screen in the user terminal 105. In this case, the questioning unit 1202 may allow the user to repeatedly click the answer buttons 1004 until the user selects the correct option. A correct answer rate recording unit 1204 computes a correct answer rate for each quiz and records that correct answer rate in the quiz DB 215. The correct answer rate may be managed on a user-by-user basis. The correct answer rate may be managed for each of user groups made up of a plurality of users. Alternatively, the correct answer rate may be managed as a correct answer rate for all users.

(8) Flowcharts (8-1) Quiz Creation Method

FIG. 13 is a flowchart illustrating a quiz creation method executed by the CPU 200 in accordance with the creation program 212.

In step S1301, the CPU 200 (the accepting unit 1101a) accepts the input of the phenomena, causes, and countermeasures for a failure. The CPU 200 may accept the input of this descriptive text through the input screen 500.

In step S1302, the CPU 200 (the extraction unit 1103) extracts comparison elements (e.g., terms) from the text input by the user. The extraction unit 1103 may, for example, execute morphological analysis and extract terms from the text input by the user.

In step S1303, the CPU 200 (the evaluation unit 1104) refers to the failure DB 214 and obtains an evaluation value for each slogan (single phrase). The evaluation unit 1104 may, for example, compute the TF–IDF as the evaluation value.

In step S1304, the CPU 200 (the sorting unit 1105) sorts the plurality of slogans (single phrases) stored in the failure DB 214 based on the evaluation value. A list of single phrases is created as a result.

In step S1305, the CPU 200 (the correct answer selection unit 1106) determines the slogan (single phrase) that is the correct option from the sorted list. The correct answer selection unit 1106 selects the single phrase having the highest evaluation value, for example.

In step S1306, the CPU 200 (the incorrect answer selection unit 1107) determines the slogans (single phrases) that are incorrect options from the sorted list. The incorrect answer selection unit 1107 may, for example, create a sublist by excluding the correct option from the sorted list, and select single phrases from the sublist as the incorrect options.

In step S1307, the CPU 200 (the generation unit 1110) generates quiz data including descriptive text of the phenomenon that serves as the question sentence, the correct option, and the incorrect options. The generation unit 1110 registers the quiz data including the descriptive text of the phenomenon that serves as the question sentence, the correct option, and the incorrect options in the quiz DB 215 by associating the quiz data with quiz identification information. The quiz data necessary for displaying the quiz screen 1000 is created in this manner.

(8-2) Method for Determining Incorrect Options

FIG. 14 is a flowchart illustrating, in detail, a method for determining the incorrect options, performed in step S1306.

In step S1401, the CPU 200 (the incorrect answer selection unit 1107) determines whether the random method has been selected through the difficulty selection screen 800. If the random method has been selected, the CPU 200 moves the sequence to step S1402. In step S1402, the CPU 200 (the incorrect answer selection unit 1107) randomly selects incorrect options from the sublist.

On the other hand, if the difficulty-based method has been selected in step S1401, the CPU 200 moves the sequence to step S1411. In step S1411, the CPU 200 (the incorrect answer selection unit 1107) divides the sublist into a plurality of groups. For example, the incorrect answer selection unit 1107 divides the sublist into a plurality of groups according to the number k of difficulties.

In step S1412, the CPU 200 (the accepting unit 1101*b*) attaches a difficulty designation. For example, the accepting unit 1101*b* attaches a difficulty designation (e.g., high, medium, or low) through the difficulty selection screen 800.

In step S1413, the CPU 200 (the incorrect answer selection unit 1107) determines the group corresponding to the designated difficulty from the plurality of groups. For example, the i-th group corresponding to the difficulty i is determined from the k groups (1≤i≤k).

In step S1414, the CPU 200 (the incorrect answer selection unit 1107) selects the incorrect options from the group corresponding to the designated difficulty. The incorrect answer selection unit 1107 selects m single phrases from the i-th group. If the i-th group contains more than j single phrases exceeding m, then m single phrases may be randomly selected from the j single phrases.

Alternatively, m single phrases may be selected from the j single phrases in order from the highest evaluation value. Alternatively, m single phrases may be selected from the j single phrases in order from the lowest evaluation value. It may be the case that the number j of single phrases included in the i-th group is less than m. In this case, the incorrect answer selection unit 1107 may select m-j single phrases from an i–1-th group having lower evaluation values. The m-j single phrases may be selected randomly. Alternatively, m-j single phrases having higher evaluation values may be selected.

(8-3) Questioning Method

FIG. 15 illustrates the questioning method executed by the CPU 200 in accordance with a questioning program 213. The CPU 200 recognizes that the user terminal 105 has accessed the questioning device 103 in accordance with the web server program 211, and executes the following processing.

In step S1501, the CPU 200 (the authentication unit 1201) authenticates the user based on the user ID and password received from the user terminal 105. If the user ID and password match, the CPU 200 moves the sequence to step S1502. If the user ID and password do not match, the CPU 200 terminates the questioning method.

In step S1502, the CPU 200 (the questioning unit 1202) displays the quiz screen 1000 in the output device 303 of the user terminal 105. The questioning unit 1202 transmits the display data constituting the quiz screen 1000 of any of the quizzes registered in the quiz DB 215 to the user terminal

105 through the web server program 211. As a result, the CPU 300 of the user terminal 105 displays the quiz screen 1000 in the output device 303 in accordance with the answering program 311.

In step S1503, the CPU 200 (the correct answer determination unit 1203) accepts the input of an answer from the user terminal 105.

In step S1504, the CPU 200 (the correct answer determination unit 1203) refers to the quiz DB 215 based on the quiz identification information associated with the quiz screen 1000, obtains the correct option, and determines whether the answer made by the user is correct. If the answer made by the user is the correct option, the CPU 200 moves the sequence to step S1505.

In step S1505, the CPU 200 (the correct answer determination unit 1203) displays a correct answer message in the user terminal 105 through the web server program 211. The CPU 200 then moves the sequence to step S1506.

If the answer made by the user in step S1504 is an incorrect option, the CPU 200 moves the sequence to step S1511. In step S1511, the CPU 200 (the correct answer determination unit 1203) displays an incorrect answer message in the user terminal 105 through the web server program 211. The CPU 200 then moves the sequence to step S1506. Note that the CPU 200 may move the sequence to step S1503 and accept the input of an answer again.

In step S1506, the CPU 200 (the correct answer rate recording unit 1204) refers to the quiz DB 215 based on the quiz identification information associated with the quiz screen 1000, and updates the correct answer rate (the number of correct answers and the number of questions). In other words, the correct answer rate recording unit 1204 applies the results of the answers to the quiz to a correct answer rate R.

$$R=C/Q \qquad \text{Eq5}$$

Here, C represents the number of correct answers. Q represents the number of questions. The quiz DB 215 stores the number of correct answers C and the number of questions Q for each quiz. Accordingly, updating the correct answer rate R is equivalent to updating the number of correct answers C and the number of questions Q. If the current result of the answer is correct, the correct answer rate R is updated as follows.

$$R=(C+1)/(Q+1) \qquad \text{Eq6}$$

If the current result of the answer is incorrect, the correct answer rate R is updated as follows.

$$R=C/(Q+1) \qquad \text{Eq7}$$

Note that if the quiz DB 215 stores the number of correct answers C and the number of questions Q for each quiz, the correct answer rate R may be computed when the correct answer rate R is needed.

In this manner, according to the first embodiment, the correct option and the incorrect options are determined based on the evaluation values. This reduces the burden on the user for creating quizzes, and makes it possible to create multiple-choice quizzes efficiently.

Second Embodiment

According to the first embodiment, both the correct option and the incorrect options are determined automatically, which greatly reduces the burden on the user. However, the user may wish to change one of the correct option or the incorrect options. Accordingly, a second embodiment provides a method for the user to adjust at least one of the correct option and the incorrect options.

FIG. 16 is a flowchart illustrating an option adjustment method executed by the CPU 200 in accordance with the creation program 212. This adjustment method may be inserted between steps S1306 and S1307, for example.

In step S1601, the CPU 200 (the determination unit 1102) displays the correct option and the incorrect options determined as quiz options in the output device 203. For example, the determination unit 1102 may display the quiz screen 1000 as a preview screen in the output device 203.

FIG. 17 illustrates an example of a preview screen 1700. Items in the preview screen 1700 that are the same as in the quiz screen 1000 are given the same reference signs. To distinguish between the correct option and the incorrect options, the CPU 200 may display the correct option in a first color (e.g., blue) and the incorrect options in a second color (e.g., red). Alternatively, as illustrates in FIG. 17, the words "correct option" and "incorrect option" may be displayed in association with each option. A confirm button 1701 is a button instructing the options displayed in the preview screen 1700 not to be changed, i.e., to be confirmed. An auto adjustment button 1702 is a button instructing the options displayed in the preview screen 1700 to be changed (adjusted) automatically. A manual adjustment button 1703 is a button instructing the options displayed in the preview screen 1700 to be changed (adjusted) manually.

In step S1602, the CPU 200 (the determination unit 1102) determines whether the options are to be changed. For example, if the auto adjustment button 1702 or the manual adjustment button 1703 is pressed, the determination unit 1102 determines that the options are to be changed. In this case, the CPU 200 moves the sequence to step S1603. When the confirm button 1701 is pressed, the determination unit 1102 determines that the options are not to be changed and terminates the option adjustment method.

In step S1603, the CPU 200 (the determination unit 1102) determines whether the options are to be changed manually. For example, if the manual adjustment button 1703 is pressed, the determination unit 1102 determines that the options are to be changed manually. In this case, the CPU 200 moves the sequence to step S1604.

In step S1604, the CPU 200 displays a list of the slogans (single phrases). This list may be the sorted list created in step S1304.

FIG. 18 illustrates an example of an option changing screen 1800. The changing screen 1800 includes a sorted list 1801, radio buttons 1802 for selecting the correct option, and check boxes 1803 for selecting the incorrect options. The user can select a single phrase to be the correct option by selecting one of the radio buttons 1802. The user can also select m incorrect options to be the incorrect options by putting a check in any of the check boxes 1803. The CPU 200 may display a warning message if more than m check boxes 1803 are checked. Alternatively, once m check boxes 1803 are checked, the CPU 200 may gray out the remaining check boxes 1803.

In step S1605, the CPU 200 (the correct answer selection unit 1106) selects the correct option in response to the user operation. For example, the correct answer selection unit 1106 may accept the selection of the correct option using the radio buttons 1802.

In step S1606, the CPU 200 (the incorrect answer selection unit 1107) selects the incorrect options in response to the user operation. For example, the incorrect answer selection unit 1107 may accept the selection of the incorrect options using the check boxes 1803. When step S1606 ends, the CPU 200 moves the sequence to step S1601.

If the auto adjustment button 1702 is pressed in step S1603, the CPU 200 determines that the options are to be changed automatically. In this case, the CPU 200 moves the sequence to step S1611.

In step S1611, the CPU 200 (the correct answer selection unit 1106) determines the slogan (single phrase) to be the correct option based on the evaluation values. For example, the correct answer selection unit 1106 determines the single phrase having the highest evaluation value in the sublist as the correct option. Note that the CPU 200 may skip step S1611 if the correct option is not to be changed.

In step S1612, the CPU 200 (the incorrect answer selection unit 1107) determines slogans (single phrases) to be the incorrect options. The incorrect answer selection unit 1107 creates a sublist excluding the slogan determined in step S1611 and executes the determination method illustrated in FIG. 14 for the created sublist. The CPU 200 then moves the sequence to step S1601 and displays the changed options in the output device 203. In step S1602, the user may instruct the CPU 200 whether to further change the options.

According to the second embodiment, the correct option or the incorrect options can be changed automatically or manually. This will make it possible to create more appropriate quizzes.

Third Embodiment

The first embodiment described the correct answer rate for each quiz as being recorded in the quiz DB 215. Here, the learning efficiency of the user will not improve if the correct answer rate is too high or too low. Accordingly, the correct answer rate should fall within a certain appropriate range. Therefore, a third embodiment provides a method for updating the incorrect options (a redetermination method) such that the correct answer rate falls within an appropriate range defined by a lower threshold Th1 and an upper threshold Th2.

FIG. 19 illustrates functions implemented by the CPU 200 in accordance with the creation program 212. A redetermination unit 1901 is part of the determination unit 1102. The redetermination unit 1901 includes an obtainment unit 1902, a difficulty changing unit 1903, and the incorrect answer selection unit 1107. The obtainment unit 1902 collects the correct answer rate for each quiz from the quiz DB 215. The difficulty changing unit 1903 reduces the difficulty set for the quiz when the correct answer rate is lower than the lower threshold Th1. The difficulty changing unit 1903 increases the difficulty set for the quiz when the correct answer rate exceeds the upper threshold Th2. The incorrect answer selection unit 1107 selects single phrases to be incorrect options in accordance with the difficulty adjusted by the difficulty changing unit 1903. As a result, the incorrect options are changed such that the correct answer rate falls within the appropriate range. The generation unit 1110 updates the quiz data with the single phrases redetermined as the incorrect options by the incorrect answer selection unit 1107.

FIG. 20 is a flowchart illustrating an incorrect option redetermination method executed by the CPU 200 in accordance with the creation program 212. When an instruction to redetermine the incorrect options is made through the input device 202, the CPU 200 executes the incorrect option redetermination method in accordance with the creation program 212.

In step S2001, the CPU 200 (the obtainment unit 1902) obtains, from the quiz DB 215, the difficulty set for the quiz that is the subject of the redetermination.

In step S2002, the CPU 200 (the obtainment unit 1902) obtains, from the quiz DB 215, the correct answer rate for the quiz that is the subject of the redetermination.

In step S2003, the CPU 200 (the difficulty changing unit 1903) determines whether the correct answer rate is lower than the lower threshold Th1. If the correct answer rate is lower than the lower threshold Th1, the CPU 200 moves the sequence to step S2004.

In step S2004, the CPU 200 (the difficulty changing unit 1903) reduces the difficulty by one level. If the current difficulty stored in the quiz DB 215 is L, the difficulty changing unit 1903 changes the difficulty L to a difficulty L−1.

In step S2005, the CPU 200 (the incorrect answer selection unit 1107) selects the incorrect options from a group having lower evaluation values. For example, the incorrect answer selection unit 1107 selects m single phrases from a group corresponding to the difficulty L−1. The method for selecting the m single phrases is as described in the first embodiment.

In step S2006, the CPU 200 (the generation unit 1110) overwrites the quiz data in the quiz DB 215 with the evaluation values (single phrases) redetermined as the incorrect options.

On the other hand, if it is determined in step S2003 that the correct answer rate is not lower than the lower threshold Th1, the CPU 200 moves the sequence to step S2011.

In step S2011, the CPU 200 (the difficulty changing unit 1903) determines whether the correct answer rate exceeds the upper threshold Th2. If the correct answer rate exceeds the upper threshold Th2, the CPU 200 moves the sequence to step S2012. If the correct answer rate is at least the lower threshold Th1 and at most the upper threshold Th2, it is not necessary to redetermine the incorrect options, and thus the CPU 200 terminates the redetermination method.

In step S2012, the CPU 200 (the difficulty changing unit 1903) increases the difficulty by one level. If the current difficulty stored in the quiz DB 215 is L, the difficulty changing unit 1903 changes the difficulty L to a difficulty L+1.

In step S2013, the CPU 200 (the incorrect answer selection unit 1107) selects the incorrect options from a group having higher evaluation values. For example, the incorrect answer selection unit 1107 selects m single phrases from a group corresponding to the difficulty L+1. The method for selecting the m single phrases is as described in the first embodiment.

In step S2006, the CPU 200 (the generation unit 1110) overwrites the quiz data in the quiz DB 215 with the evaluation values (single phrases) redetermined as the incorrect options.

According to the third embodiment, the incorrect options are redetermined such that the correct answer rate falls within an appropriate range. This will further improve the efficiency of learning about failures through quizzes.

SPECIFIC EXAMPLES

Example 1

The single phrases are slogans that express knowledge in a concise manner and thus suggest various failures. In addition, the single phrases and knowledge are sentences extracted from specific failures as higher-level concepts. The single phrases and knowledge may therefore be ambiguous. Therefore, several specific examples will be described below.

FIG. 21 illustrates a lesson related to rating plates affixed to electronic devices, such as printers, or the boxes thereof. The rating plate contains letters and numbers indicating the rating (e.g., the power consumption) of the electronic device. The rating plate also includes letters, marks, and the like for each destination. For example, the CE mark is a mark certifying that a product meets the standards of all EU member countries. The CCC mark is a mark certifying that a product imported into China meets China's domestic technical standards.

A rating plate 2101 is a correct rating plate that includes a China RoHS mark 2103. A rating plate 2102 is an incorrect rating plate that does not include the China RoHS mark 2103. The phenomenon for this failure is that "a printer having a rating plate affixed that lacks the China RoHS mark has been shipped". The causes are as follows. When a worker attempted to correct blurry text on the rating plate using label creation software, the worker accidentally deleted the RoHS mark. The worker did not realize that they had deleted the RoHS mark and overwrote the file for the rating plate. The countermeasure is "use an automatic image recognition system to detect rating plates missing the China RoHS mark so that rating plates missing the China RoHS mark are not issued".

The single phrase "trusting marks increases risk" is obtained from this failure. In addition, the following knowledge was obtained. Workers are less likely to notice mistakes when there are displays including various languages and collections of marks. Workers should therefore take caution with strings of numbers, unfamiliar languages, and marks whose meanings are difficult for the workers to discern. The more complex the information is, the more difficult it is for the human eye to detect errors. It should be confirmed that no mistakes have been made, using image recognition or the like.

Example 2

FIG. 22 is a diagram illustrating Example 2. Agitation sheets 2201 and 2202 are components that agitate toner in a toner container in a developing device installed in an electrophotographic image forming device. A magazine 2200 is loaded with a number of the agitation sheets 2201 and 2202. Each of the agitation sheets 2201 and 2202 has four corners, one corner of which is cut out. This is called a "C-plane". In FIG. 22, the agitation sheet 2201 is oriented correctly, but the agitation sheet 2202 is oriented incorrectly. The phenomenon in this failure is that "the worker was unable to assemble the agitation sheet 2202 supplied from the magazine 2200 to the product, and the production line was stopped as a result". The causes are as follows. To enable a worker to visually identify the front and back of the agitation sheets 2201 and 2202, a C-plane shape is provided in the agitation sheets 2201 and 2202. However, even if the agitation sheet 2202 is oriented incorrectly, it is still possible to set the agitation sheet 2202 in the magazine 2200. The countermeasure is "the inner surface shape of the magazine 2200 has been improved so that when a worker orients the C-plane shape in the correct direction, the agitation sheets 2201 and 2202 can be set in the magazine 2200".

The single phrase "assembly mistake, careless mistake, choice mistake" was extracted from this failure. The knowledge is as follows. Workers are likely to make mistakes when assembling two components that look the same and which have orientations that are difficult to distinguish. It is necessary to take care with gears, rollers, springs, connectors, rollers, and sheets. It is important to create product specifications and supply equipment specifications that ensure that only the correct components are assembled into the product with the correct orientations.

Example 3

FIG. 23 is a diagram illustrating Example 3. FIG. 23 illustrates mainly the area around a discharge port of a printer 2300. A discharge roller pair 2301 discharges a sheet 2302 on which an image is formed to the outside of the printer 2300. A lever 2303 pushes the sheet 2302 downward from above so that the sheet 2302 is discharged in a stable manner. The lever 2303 pivots about a pivot shaft 2304. When the sheet 2302 comes into contact with the lever 2303, the lever 2303 pivots and the tip of the lever 2303 moves upward. When the discharge of the sheet 2302 is complete, the lever 2303 pivots in the opposite direction and returns to a standby position. Polyurethane foam 2305 is disposed near the base end of the lever 2303 to absorb shock. When the polyurethane foam 2305 is in its normal shape, the lever 2303 is in an ideal standby position, indicated by the broken line. However, when the polyurethane foam 2305 deforms over time, the lever 2303 will be in the standby position indicated by the solid line. In the latter case, the trailing edge of the sheet 2302 will ride up on the lever 2303. When a subsequent sheet 2309 is discharged, the subsequent sheet 2309 pushes the lever 2303 up. This causes the tip of the lever 2303 to rise, and the tip of the lever 2303 pushes the sheet 2302 out.

Therefore, here, the phenomenon is that "the trailing edge of the discharged sheet 2302 rode up onto the lever 2303 which held the discharged sheet 2302 down, causing the lever 2303 to push the sheet 2302 out, which in turn caused the sheet 2302 to drop". The causes are as follows. A sponge (the polyurethane foam 2305) is used to reduce sounds produced when the lever 2303 returns to the standby position. The polyurethane foam 2305 compacted over time, and the standby position of the tip of the lever 2303 has shifted from the proper position. The countermeasures are as follows. A rib was added to the lever 2303. This enables the position of the tip of the lever 2303 to stay in the proper position even if the polyurethane foam 2305 is compacted.

The single phrase "exhausted shock absorbers" was extracted from this failure. The knowledge is as follows. The positions of the end faces of a shock-absorbing member change as the shock-absorbing member bends or is compacted. When a shock-absorbing member is subjected to loads repeatedly, the shock-absorbing member will be crushed and the shape of the shock-absorbing member will change. Therefore, as a rule, materials that bend, crush, or wear down should not be employed as members used for alignment.

In this manner, a multiple-choice quiz is created from failures related to the manufacture of electronic devices. Answering the multiple-choice quiz enables not only new employees, but also experienced employees, to learn from past failures and prevent such failures from occurring.

OTHER EMBODIMENTS (1) Other Example of User Terminal

FIGS. 24 and 25 illustrate other examples of the user terminal 105. In this example, the storage device 310 of the user terminal 105 has the creation program 212, the questioning program 213, the failure DB 214, and the quiz DB 215 delivered from the learning support apparatus 101. The CPU 300 executes the creation program 212 and the questioning program 213 instead of the CPU 200. In this manner, the user terminal 105 may operate as a standalone learning support apparatus 101.

As illustrated in FIG. 25, the failure DB 214 may be held in the learning support apparatus 101, which functions as a database server. In this case, the CPU 300 accesses the failure DB 214 over the network to obtain the failures. In this case, the user terminal 105 functions as a client.

(2) Method for Implementing Learning Support System

FIG. 26 illustrates a method through which the user terminal 105, which is a client, accesses the learning support apparatus 101, which is a server, and through which the user terminal 105 transmits the data and instructions necessary to create a quiz to the learning support apparatus 101. In other words, FIG. 26 illustrates a method for implementing the learning support system 100. In this example, the learning support apparatus 101 includes the creation program 212, the questioning program 213, the failure DB 214, and the quiz DB 215.

In step S2601, the CPU 300 accesses the learning support apparatus 101 and uploads failures to the failure DB 214. For example, a plurality of failures and a plurality of lessons obtained from corresponding ones of the plurality of failures may be uploaded.

In step S2602, the CPU 300 transmits text (e.g., the phenomenon, cause, and countermeasure) that serves as question sentences entered through the input device 302 to the learning support apparatus 101.

In step S2603, the CPU 300 causes the learning support apparatus 101 to compute the evaluation values. For example, the CPU 300 transmits a request to the learning support apparatus 101 to instruct the computation of the evaluation values to start. The CPU 300 may receive a list of the evaluation values as a response and display the list in the output device 303. The method for computing the evaluation value is as described above. For example, the evaluation value may be an evaluation value for the consistency between the text accepted by the server and each of the plurality of lessons stored in the server.

In step S2604, the CPU 300 causes the learning support apparatus 101 to sort the plurality of slogans based on the evaluation values. For example, the CPU 300 transmits a request to the learning support apparatus 101 to instruct the sorting to be performed. The sorting method is as described above.

In step S2605, the CPU 300 causes the learning support apparatus 101 to determine a slogan to serve as the correct option. For example, the CPU 300 transmits a request to the learning support apparatus 101 to instruct the determination of the correct option. The method for determining the correct option is as described above.

In step S2606, the CPU 300 causes the learning support apparatus 101 to determine slogans to serve as incorrect options. For example, the CPU 300 transmits a request to the learning support apparatus 101 to instruct the determination of the incorrect options. The method for determining the incorrect option is as described above.

In step S2607, the CPU 300 causes the learning support apparatus 101 to create quiz data include the correct option and the incorrect options. For example, the CPU 300 transmits a request to the learning support apparatus 101 to instruct the quiz data to be corrected. The quiz data is registered in the quiz DB 215 as a result.

(3) Answering Method

FIG. 27 is a flowchart illustrating an answering method executed in the user terminal 105. The CPU 300 executes the following processing in accordance with the answering program 311.

In step S2701, the CPU 300 accesses the quiz DB 215 of the learning support apparatus 101 and obtains the multiple-choice quiz (quiz data). The quiz includes one lesson that serves as a correct option and at least one lesson that serves as an incorrect option.

In step S2702, the CPU 300 displays the multiple-choice quiz in the output device 303. The output device 303 may display the quiz screen 1000, for example.

In step S2703, the CPU 300 accepts the input of an answer (the selection of an option) from the user through the input device 302. The answer may be identification information of the option. The input of the answer may be realized by the button corresponding to the option being operated.

In step S2704, the CPU 300 transmits the answer input through the input device 302 to the learning support apparatus 101.

In step S2705, the CPU 300 receives the answer result from the learning support apparatus 101. The answer result includes result information indicating a correct or an incorrect answer.

In step S2706, the CPU 300 displays the answer result received from the learning support apparatus 101 in the output device 303.

The present invention is not limited to the above embodiments and various changes and modifications can be made within the spirit and scope of the present invention. Therefore, to apprise the public of the scope of the present invention, the following claims are made.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-141516, filed Sep. 6, 2022 which is hereby incorporated by reference herein in its entirety.

What is claimed is:

1. A learning support apparatus for creating a multiple-choice quiz, the learning support apparatus comprising:

a storage device configured to store, in advance, a plurality of failures and a plurality of lessons obtained from corresponding ones of the plurality of failures; and at least one processor configured to perform operations including:

an accepting operation of accepting input of text serving as a question sentence in the multiple-choice quiz;

a computing operation of computing an evaluation value for a consistency between the text accepted in the accepting operation and each of the plurality of lessons stored in the storage device; and a determination operation of determining one lesson to serve as a correct option in the multiple-choice quiz and at least one lesson to serve as an incorrect option in the multiple-choice quiz, based on the evaluation value for each of the plurality of lessons computed in the computing operation, wherein the evaluation value includes a degree of matching between the text accepted in the accepting operation and the lesson stored in the storage device, wherein each of the plurality of failures includes descriptive text of a phenomenon serving as a failure, and the computing operation includes:

an operation of computing a degree of matching to which the question sentence matches a lesson associated with the phenomenon, and computing a degree of matching to which the question sentence matches the descriptive text of the phenomenon; and an operation of computing, as the evaluation value, a sum of the degree of matching computed for the lesson and the degree of matching computed for the descriptive text of the phenomenon, and wherein the at least one processor is configured to perform further operations including an adjustment operation in which the one lesson serving as the correct option in the multiple-choice quiz and/or the at least one lesson serving as the incorrect option in the multiple-choice quiz may be changed, the adjustment operation including:

causing display of a graphical user interface including the one lesson serving as the correct option in the multiple-choice quiz and the at least one lesson serving as the incorrect option in the multiple-choice quiz together with a first selectable item and a second selectable item, wherein in a case where the first selectable item is selected, the one lesson serving as the correct option in the multiple-choice quiz and/or the at least one lesson serving as the incorrect option in the multiple-choice quiz are automatically changed without user input, and wherein in a case where the second selectable item is selected, the one lesson serving as the correct option in the multiple-choice quiz and/or the at least one lesson serving as the incorrect option in the multiple-choice quiz are manually changeable according to user input.

2. The learning support apparatus according to claim 1, where the plurality of lessons include:

knowledge, extracted from a failure in advance, that includes at least one of a phenomenon of a failure, a cause of the failure, and a countermeasure for the failure; and a slogan that concisely expresses the knowledge.

3. The learning support apparatus according to claim 2, wherein the question sentence includes descriptive text describing the phenomenon of the failure, and the computing operation includes an operation of computing, as the evaluation value, a degree of matching to which the question sentence matches each of a plurality of pairs of the knowledge and the slogan stored in the storage device.

4. The learning support apparatus according to claim 2, wherein the question sentence includes descriptive text describing the cause of the failure, and the computing operation includes an operation of computing, as the evaluation value, a degree of matching to which the question sentence matches each of a plurality of pairs of the knowledge and the slogan stored in the storage device.

5. The learning support apparatus according to claim 2, wherein the question sentence includes descriptive text describing the countermeasure for the failure, and the computing operation includes an operation of computing, as the evaluation value, a degree of matching to which the question sentence matches each of a plurality of pairs of the knowledge and the slogan stored in the storage device.

6. The learning support apparatus according to claim 1, wherein the plurality of lessons include:

knowledge, extracted from a failure in advance, that includes at least one of a phenomenon of a failure, a cause of the failure, and a countermeasure for the failure;

a slogan that concisely expresses the knowledge; and tag information including a plurality of keywords pertaining to the failure.

7. The learning support apparatus according to claim 1, wherein each of the plurality of failures further includes descriptive text of a cause of the phenomenon, and the computing operation further includes:

an operation of computing a degree of matching to which the question sentence matches the descriptive text of the cause; and an operation of computing, as the evaluation value, a sum of the degree of matching computed for the lesson, the degree of matching computed for the descriptive text of the phenomenon, and the degree of matching computed for the descriptive text of the cause.

8. The learning support apparatus according to claim 1, wherein each of the plurality of failures further includes descriptive text of a cause of the phenomenon and descriptive text of a countermeasure for suppressing occurrence of the phenomenon, and the computing operation further includes:

an operation of computing a degree of matching to which the question sentence matches the descriptive text of the cause and a degree of matching to which the question sentence matches the descriptive text of the countermeasure; and an operation of computing, as the evaluation value, a sum of the degree of matching computed for the lesson, the degree of matching computed for the descriptive text of the phenomenon, the degree of matching computed for the descriptive text of the cause, and the degree of matching computed for the descriptive text of the countermeasure.

9. The learning support apparatus according to claim 1, wherein the determination operation includes:

an operation of determining a single lesson having a maximum evaluation value as the correct option by comparing the evaluation value of each of the plurality of lessons; and an operation of determining at least one lesson having the evaluation value lower than the maximum evaluation value as the incorrect option.

10. The learning support apparatus according to claim 9, wherein the determination operation includes an operation of randomly determining at least one lesson having the evaluation value lower than the maximum evaluation value as the incorrect option.

11. The learning support apparatus according to claim 9, further comprising:

an input device that inputs a parameter indicating a difficulty of the quiz, wherein the determination operation includes an operation of determining, as the incorrect option, at least one lesson having the evaluation value based on the parameter input.

12. The learning support apparatus according to claim 11, wherein the operations further include:

a sorting operation of sorting the plurality of lessons in order from highest evaluation value; and a dividing operation of dividing the plurality of lessons sorted in the sorting operation into n groups, and the determination operation includes:

an operation of selecting one group, among the n groups, that corresponds to the parameter; and an operation of determining, as the incorrect option, the at least one lesson from the group selected.

13. The learning support apparatus according to claim 12, wherein the determination operation includes an operation of randomly determining, as the incorrect option, the at least one lesson from the group selected.

14. The learning support apparatus according to claim 11, wherein the determination operation includes:

an operation of obtaining a threshold based on the parameter input; and an operation of determining, as the incorrect option, at least one lesson having the evaluation value less than or equal to the threshold.

15. A learning support apparatus for creating a multiple-choice quiz, the learning support apparatus comprising:

a storage device configured to store, in advance, a plurality of failures and a plurality of lessons obtained from corresponding ones of the plurality of failures;

at least one processor configured to perform operations including:

an accepting operation of accepting input of text serving as a question sentence in the multiple-choice quiz;

a computing operation of computing an evaluation value for a consistency between the text accepted in the accepting operation and each of the plurality of lessons stored in the storage device; and a determination operation of determining one lesson to serve as a correct option in the multiple-choice quiz and at least one lesson to serve as an incorrect option in the multiple-choice quiz, based on the evaluation value for each of the plurality of lessons computed in
the computing operation; and an input device that inputs a parameter indicating a
difficulty of the quiz, wherein the determination operation includes:

an operation of determining a single lesson having a
maximum evaluation value as the correct option by
comparing the evaluation values of the plurality of
lessons; and an operation of determining at least one lesson having an
evaluation value lower than the maximum evaluation
value as the incorrect option, wherein the determination operation includes an opera-
tion of determining, as the incorrect option, at least one
lesson having an evaluation value based on the param-
eter input, wherein the determination operation includes:

an operation of obtaining a threshold based on the
parameter input; and an operation of determining, as the incorrect option, at
least one lesson having the evaluation value lower
than the maximum evaluation value and higher than
the threshold, and wherein the at least one processor is configured to per-
form further operations including an adjustment opera-
tion in which the one lesson serving as the correct
option in the multiple-choice quiz and/or the at least
one lesson serving as the incorrect option in the mul-
tiple-choice quiz may be changed, the adjustment
operation including:

causing display of a graphical user interface including
the one lesson serving as the correct option in the
multiple-choice quiz and the at least one lesson
serving as the incorrect option in the multiple-choice
quiz together with a first selectable item and a second
selectable item, wherein in a case where the first selectable item is
selected, the one lesson serving as the correct option
in the multiple-choice quiz and/or the at least one
lesson serving as the incorrect option in the multiple-
choice quiz are automatically changed without user
input, and wherein in a case where the second selectable item is
selected, the one lesson serving as the correct option
in the multiple-choice quiz and/or the at least one
lesson serving as the incorrect option in the multiple-
choice quiz are manually changeable according to
user input.

16. The learning support apparatus according to claim 11,
wherein the parameter is a parameter indicating one
difficulty among n levels of difficulty (where n is an
integer of 2 or greater), n−1 thresholds are provided with respect to the n levels of
difficulty, and the determination operation includes:

an operation of, when an n-th difficulty that is highest
among the n levels of difficulty is selected, deter-
mining, as the incorrect option, at least one lesson
having the evaluation value higher than an n−1-th
threshold that is highest;

an operation of, when an i-th difficulty lower than the
n-th difficulty is selected, determining, as the incor-
rect option, at least one lesson having the evaluation
value greater than an i−1-th threshold and less than
or equal to an i-th threshold; and an operation of, when a first difficulty that is lowest
among the n levels of difficulty is selected, determining, as the incorrect option, at least one lesson
having the evaluation value less than or equal to a
first threshold that is lowest among n-1 thresholds.

17. The learning support apparatus according to claim 1,
wherein the operations further include:

a recording operation of recording a correct answer rate
for the quiz; and a redetermining operation of redetermining the incor-
rect option included in the quiz in accordance with
the correct answer rate.

18. A learning support apparatus for creating a multiple-
choice quiz, the learning support apparatus comprising:

a storage device configured to store, in advance, a plu-
rality of failures and a plurality of lessons obtained
from corresponding ones of the plurality of failures;
and at least one processor configured to perform operations
including:

an accepting operation of accepting input of text serv-
ing as a question sentence in the multiple-choice
quiz;

a computing operation of computing an evaluation
value for a consistency between the text accepted in
the accepting operation and each of the plurality of
lessons stored in the storage device;

a determination operation of determining one lesson to
serve as a correct option in the multiple-choice quiz
and at least one lesson to serve as an incorrect option
in the multiple-choice quiz, based on the evaluation
value for each of the plurality of lessons computed in
the computing operation:

a recording operation of recording a correct answer rate
for the quiz; and a redetermining operation of redetermining the incor-
rect option included in the quiz in accordance with
the correct answer rate, wherein the quiz includes a first lesson having a first
evaluation value as the incorrect option, and the redetermining operation includes:

an operation of determining a second lesson having the
evaluation value lower than the first evaluation value
as the incorrect option instead of the first lesson
when the correct answer rate is lower than a first
appropriate correct answer rate; and an operation of determining a third lesson having the
evaluation value higher than the first evaluation
value as the incorrect option instead of the first
lesson when the correct answer rate is higher than a
second appropriate correct answer rate, and wherein the at least one processor is configured to per-
form further operations including an adjustment opera-
tion in which the one lesson serving as the correct
option in the multiple-choice quiz and/or the at least
one lesson serving as the incorrect option in the mul-
tiple-choice quiz may be changed, the adjustment
operation including:

causing display of a graphical user interface including
the one lesson serving as the correct option in the
multiple-choice quiz and the at least one lesson
serving as the incorrect option in the multiple-choice
quiz together with a first selectable item and a second
selectable item, wherein in a case where the first selectable item is
selected, the one lesson serving as the correct option
in the multiple-choice quiz and/or the at least one lesson serving as the incorrect option in the multiple-choice quiz are automatically changed without user input, and wherein in a case where the second selectable item is selected, the one lesson serving as the correct option in the multiple-choice quiz and/or the at least one lesson serving as the incorrect option in the multiple-choice quiz are manually changeable according to user input.

19. The learning support apparatus according to claim 1, wherein the adjustment operation further includes, in the case where the second selectable item is selected:

a display operation of displaying at least one lesson, among the plurality of lessons, that has not been determined to be the correct option, in a selectable manner as another lesson, and the determination operation includes:

an operation of determining one lesson, selected as the another lesson from among the at least one lesson displayed in the display operation, as the correct option.

20. The learning support apparatus according to claim 1, wherein the adjustment operation further includes, in the case where the second selectable item is selected:

a display operation of displaying at least one lesson, among the plurality of lessons, that has not been determined to be the incorrect option, in a selectable manner as another lesson, and the determination operation includes:

an operation of determining, as the incorrect option, at least one lesson selected as the another lesson from among the at least one lesson displayed in the display operation.

21. The learning support apparatus according to claim 1, wherein the operations further include:

a display operation of displaying the question sentence, as well as displaying a plurality of options including one lesson to serve as the correct option and at least one lesson to serve as the incorrect option determined in the determination operation;

a selection operation of accepting a selection of an option, from among the plurality of options displayed in the display operation, that is an answer by a respondent; and a correct answer determination operation of determining whether the option that is the answer is the correct option.

\* \* \* \* \*